(12) United States Patent
Nagatomo et al.

(10) Patent No.: US 6,334,126 B1
(45) Date of Patent: Dec. 25, 2001

(54) DATA OUTPUT SYSTEM, COMMUNICATION TERMINAL TO BE CONNECTED TO DATA OUTPUT SYSTEM, DATA OUTPUT METHOD AND STORAGE MEDIUM

(75) Inventors: Shoichi Nagatomo, Fussa; Junji Yamaguchi, Akishima, both of (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/138,978

(22) Filed: Aug. 24, 1998

(30) Foreign Application Priority Data

Aug. 26, 1997 (JP) .................................................. 9-228736
Apr. 3, 1998 (JP) ................................................. 10-091110

(51) Int. Cl.[7] .................................................. G06F 17/30
(52) U.S. Cl. .................................. 707/4; 707/1; 707/100; 709/223
(58) Field of Search .................................. 707/3, 4, 100; 709/206, 223

(56) References Cited

U.S. PATENT DOCUMENTS 5,222,234 * 6/1993 Wang et al. ............................ 707/3
5,855,013 * 12/1998 Fisk ....................................... 707/3
5,894,558 * 4/1999 Falker .............................. 395/200.69
6,014,688 * 1/2000 Venkatraman et al. .............. 709/206

FOREIGN PATENT DOCUMENTS 7-021030  1/1995  (JP) .
7-114406  12/1995  (JP) .
8-328831  12/1996  (JP) .

* cited by examiner

*Primary Examiner*—John Breene
*Assistant Examiner*—Cheryl Lewis
(74) *Attorney, Agent, or Firm*—Frishauf, Holtz, Goodman, Langer & Chick, P.C.

(57) ABSTRACT

In a data output system, a server to which this invention is adapted is connected to a database which holds data of plural types of data formats, searches the database based on the content of a search request made by a search requester, and outputs the search result after performing conversion and edition on the search result in accordance with the ability, function and/or capacity of a communication terminal to which the search result is to be output.

20 Claims, 22 Drawing Sheets

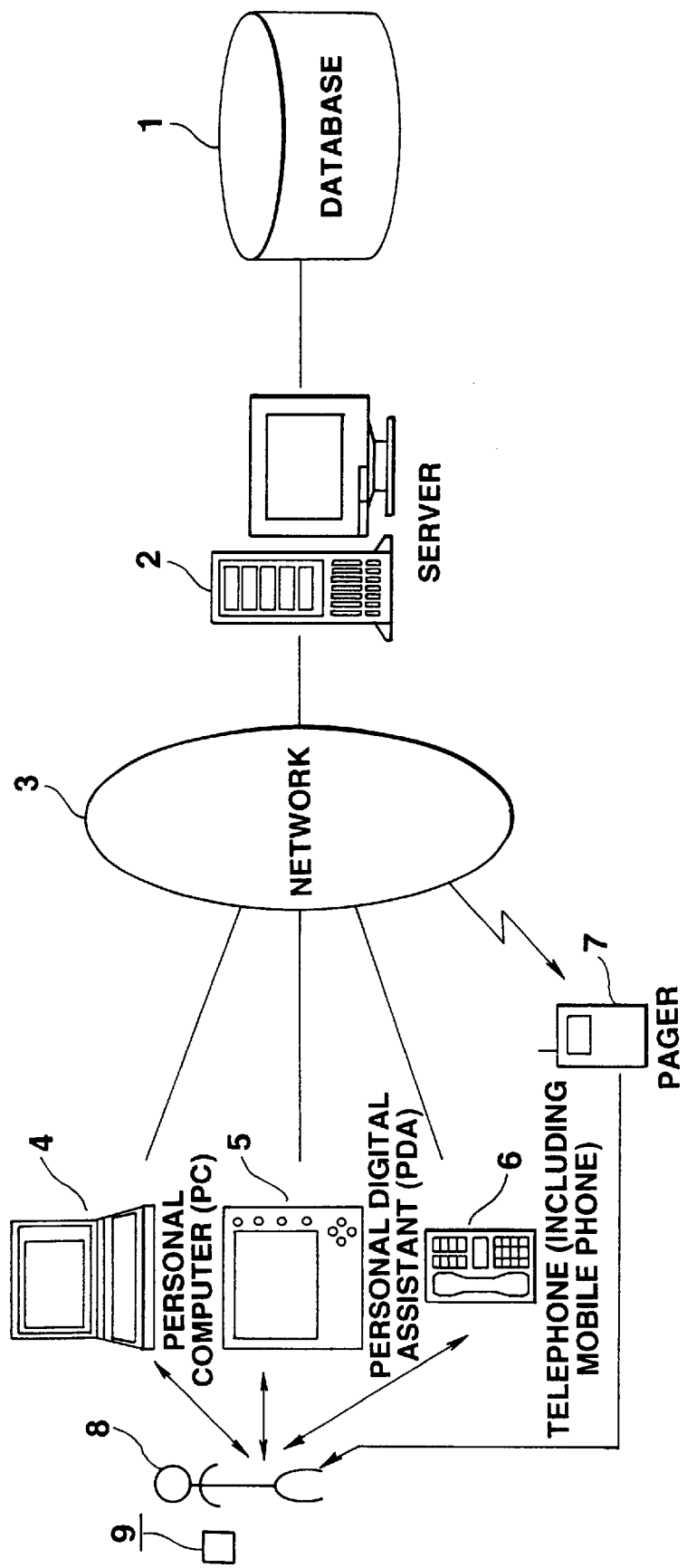

FIG.3A

```
START
  ↓
S1: USER INPUTS A REQUEST TO SEARCH DATA BASE
  ↓
S2: ESTABLISH CONNECTION
  ↓
S11: INFORM COMMUNICATION TERMINAL AT TRANSMISSION DESTINATION AND ABILITY OR THE LIKE OF THE COMMUNICATION TERMINAL AT TRANSMISSION DESITNATION
  ↓
S4: SEARCH REQUEST
  ↓
END
```

FIG.3B

| | |
|---|---|
| · SENDER ADDRESS<br><br>· RECEIVER ADDRESS | · TERMINAL ID<br>· COMMAND<br>· TERMINAL ID OF COMMUNICATION TERMINAL AT DESTINATION<br>· TRANSMISSION TERMINAL ID CODE OF COMMUNICATION TERMINAL AT TRANSMISSION DESTINATION<br>· PROGRAM NUMBER |

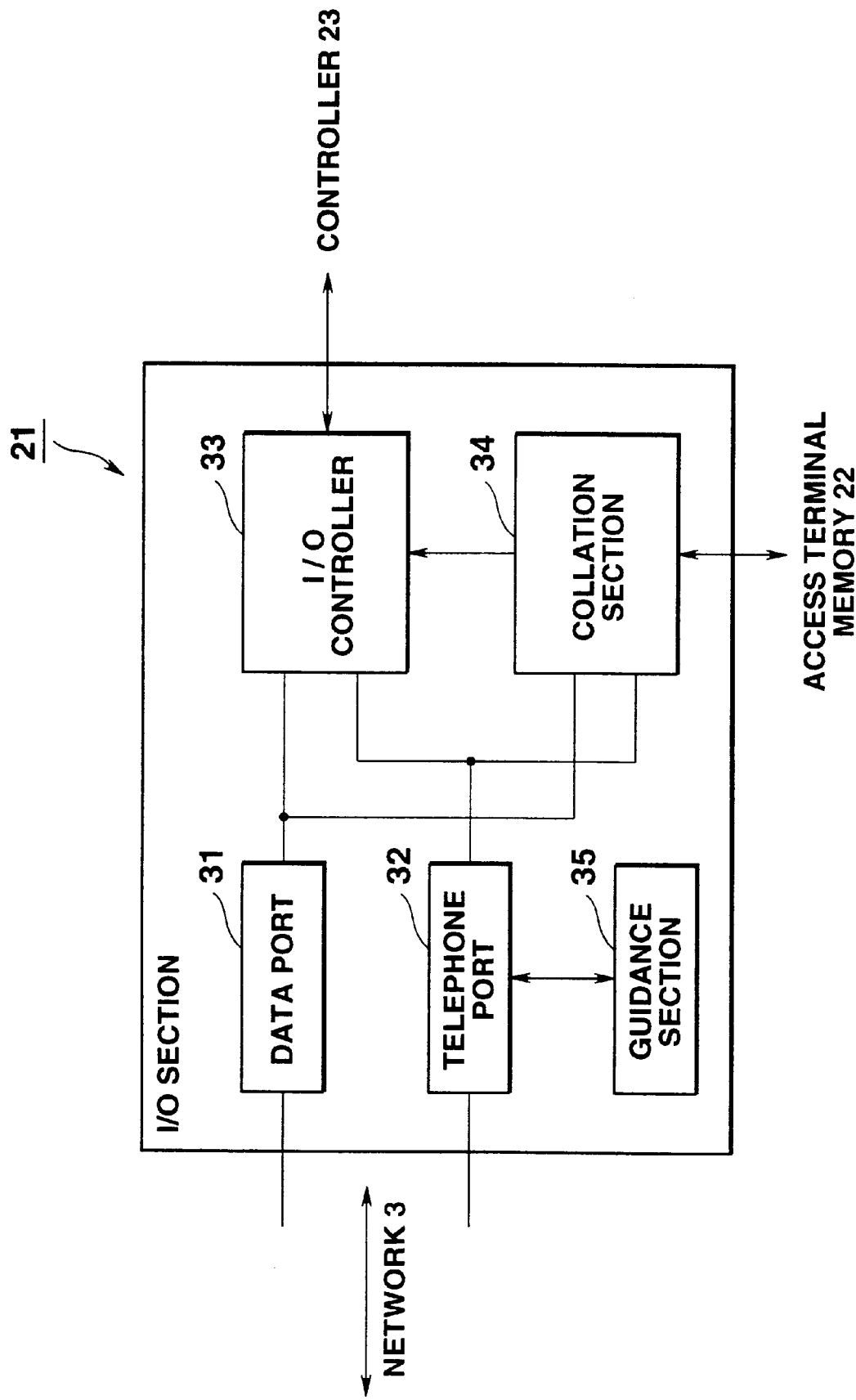

| TERMINAL ID CODE | COMMUNICATION TERMINAL TYPE | IMAGE | VOICE | TEXT | CAPACITY |
|---|---|---|---|---|---|
| 101<br>102<br>⋮ | } PC | ○<br>○<br>⋮ | ○<br>—<br>⋮ | ○<br>○<br>⋮ | 2MB<br>1MB<br>⋮ |
| 201<br>202<br>⋮ | } PDA | ○<br>○<br>⋮ | ○<br>—<br>⋮ | ○<br>○<br>⋮ | 500KB<br>100KB<br>⋮ |
| 301<br>302<br>⋮ | } TELEPHONE | —<br>—<br>⋮ | ○<br>○<br>⋮ | ○<br>—<br>⋮ | 100B<br>50B<br>⋮ |
| 401<br>402<br>⋮ | } PAGER | —<br>—<br>⋮ | —<br>—<br>⋮ | ○<br>○<br>⋮ | 100B<br>50B<br>⋮ |

| PROGRAM NUMBER | PROGRAM TYPE |
|---|---|
| 101 | OS A IMAGE COMPRESS/ DECOMPRESSION PROGRAM A |
| 102 | OS B IMAGE COMPRESS/ DECOMPRESSION PROGRAM B |
| ⋮ | ⋮ |
| 201 | OS A DOCUMENT PREPARING APPLICATION A |
| 202 | OS B DOCUMENT PREPARING APPLICATION B |
| ⋮ | ⋮ |

| STORAGE ADDRESS | FILE NAME | DATA AMOUNT | DATA ATTRIBUTE |
|---|---|---|---|
| DB1 | A | 100MB | IMAGE + TEXT |
| DB2 | B | 30MB | VOICE |
| DB3 | C | 500KB | TEXT |
| ⋮ | ⋮ | ⋮ | ⋮ |

FIG.18

| TERMINAL ID | KEYWORD | SEARCH RESULT | (INTERNET ADDRESS) | DATE OF PREVIOUS RENEWAL |
|---|---|---|---|---|
| 000-000-0000 | FISHING | HP OF FISHER TAIKOUBOU | http://WWW.AAA.ac.jp<br>http://WWW.BBB.or.jp | 1998. 01. 31 |
|  | OUTDOOR | TREKKING ROOM<br>TREKKING OF MOUNTAIN ROADS | http://WWW.CCC.or.jp<br>http://WWW.DDD.or.jp |  |
| ............ | ............ | ............ | ............ | ............ |

41

DATA OUTPUT SYSTEM, COMMUNICATION TERMINAL TO BE CONNECTED TO DATA OUTPUT SYSTEM, DATA OUTPUT METHOD AND STORAGE MEDIUM

BACKGROUND OF THE INVENTION

1. Field of the Invention

The present invention relates to a system which outputs data to other apparatuses, a communication terminal connected to a data output system, a data output method applied to a data communication system, and a storage medium applied to a system constructed data output system and communication terminal.

2. Description of the Related Art

In searching for information, a searcher often gains access to a database on a network through a personal computer, a PDA (Personal Digital Assistant) or a telephone to acquire a desired search result.

Recently it has become popular for people (searchers) to connect to the Internet and obtain desired information.

If browser software is installed in a personal computer, PDA or the like, which is used in information searching, a user (searcher) can acquire information from any desirable homepage or a site which has been searched by a search engine.

A searcher can of course obtain various kinds of information from another apparatus/database located on a communication network without going through the Internet.

When a searcher uses any telephone (including a portable terminal or PHS), the searcher acquires desired information by manipulating buttons and the like in accordance with voice guidance.

Conventional database managing systems that are used on communication networks include a typical system named an OUS (Oracle Universal Server), a new generation information managing system by Oracle Corporation, which has separate storage areas in a server for different data attributes (image, voice and text) and manages image data, voice data and text data independently.

When a searcher (who uses a database via a communication network) accesses a database and requests information using a communication terminal with various functions and ability, like a personal computer, PDA or telephone, however, the aforementioned conventional server usually sends data, such as the result of the requested search, without considering the functions or ability of the communication terminal at the sender or the transmission destination.

Even if the server sends the search result to the communication terminal used by the searcher, the searcher may not be able to output the search result or the communication terminal may not be able to receive the search result, depending on the ability.

Suppose that the server acquires image data as a result of the requested search and sends the image data to the communication terminal of the searcher.

If the communication terminal does not have an image display function, the image data sent from the server appears as garbage, disabling a searcher to obtain the search result.

Existing cellular phones, when used as a communication terminal, are limited to transmit and receive electric mails (e-mails), except when they are used in data communication while being connected to a portable computer like a PDA, and cannot be used stand-alone to allow users to view homepages and the like.

As mentioned above, since the conventional servers do not consider the functions or ability of the communication terminal at the transmission destination at the time of outputting data to a searcher, the communication terminal at the data transmission destination cannot output the sent data, depending on the attribute of that data.

SUMMARY OF THE INVENTION

Accordingly, it is an object of the present invention to provide a data output system, a communication terminal to be connected to a data output system, a data output method and a storage medium, which output data to be output as a search result after converting the format of the data to the data format requested by a receiving end, based on the contents of a request made by a search requester.

To achieve the above object, according to the first aspect of this invention, a data output system, which is connected to data storage means for storing data of plural types of data formats and outputs data from the data storage means, comprises input means for inputting a search request for data stored in the data storage means; identification means for searching data stored in the data storage means based on a content of the search request and identifying a data format of a search result; detection means for detecting a data format requested by a data transmission destination based on the content of the search request; collation means for collating the data format of the search result, identified by the identification means, with the data format requested by the data transmission destination and detected by the detection means; an d conversion means for converting the data format of the search result to the data format requested by the data transmission destination, when both data formats do not match with each other.

With this structure, requested data can be output after converting the format of data to be output as a search result to the data format that is requested by a data transmission destination, based on the content of a search request made by a search requester.

The input means may include switch means for switching a control content in accordance with a data format to be input; discrimination means for discriminating the data format of the search request input through the input means; and control means for controlling the switch means in accordance with the data format discriminated by the discrimination means.

The data format requested by the data transmission destination may be included in the search request.

The data output system may further comprise communication terminals to be externally connected to the data output system via a network, and reception means for receiving data from the communication terminals; and the input means may input the data, received by the reception means, as at least one of a search request and a data format requested by a data transmission destination.

It is preferable that the data format requested by the data transmission destination is the format of data outputtable by a communication terminal to which the data is to be output.

The detection means may detect an ability of a communication terminal to which data is to be output, as the data format requested by the data transmission destination, and the conversion means may include processing means for processing data, read from the data storage means, based on the ability of the communication terminal detected by the detection means.

The detection means may detect a function of a communication terminal to which data is to be output, as the data format requested by the data transmission destination, and the conversion means may include processing means for processing data, read from the data storage means, based on the function of the communication terminal detected by the detection means.

The detection means may detect a capacity of a communication terminal to which data is to be output, as the data format requested by the data transmission destination, and the conversion means may include processing means for processing data, read from the data storage means, based on the capacity of the communication terminal detected by the detection means.

The data storage means may be located on an information public network specified by at least an address for designating a storage position for data; the data output system may further comprise acquisition means for acquiring information for specifying the data, and search means for searching for an address of the storage position for the data, based on the information acquired by the acquisition means; and the conversion means may read data stored at the address searched by the search means and convert the read data in such a way that a format of the read data matches with the data format detected by the detection means.

The information for specifying the data may be a keyword.

The searched address may be reported to a requester which has requested outputting of data.

According to the second aspect of this invention, a communication terminal, which is connected to a data output apparatus connected to data storage means for storing data of plural types of data formats, transmits a search request for data to the data output apparatus, and acquires and outputs data of plural types of data formats as a search result, comprises transmission means for transmitting data including at least an address of a communication terminal to which the data is to be output, and a data format outputtable by that communication terminal, as the search request for data stored in the data storage means.

With this structure, the communication terminal can acquire a search result in the requested data format based on the content of a search request made by a search requester.

The outputtable data format may define an ability of the communication terminal to which the data is to be output.

The outputtable data format may define a function of the communication terminal to which the data is to be output.

The outputtable data format may define a capacity of the communication terminal to which the data is to be output.

A control content for generating data to be transmitted by the transmission means may be stored on a storage medium designed attachable to and detachable from the communication terminal.

A control content for generating data to be transmitted by the transmission means may be acquired from the database.

According to the third aspect of this invention, a data output method for connecting to a data storage medium for storing data of plural types of data formats and outputting data, comprises the steps of inputting a search request for data stored in the data storage medium; searching data stored in the data storage medium based on a content of the search request and identifying a data format of a search result; detecting a data format requested by a data transmission destination based on the content of the search request; collating the data format of the search result, identified by the identification step, with the data format detected by the detection step; and converting the data format of the search result when the data format of the search request does not match with the data format requested by the data transmission destination.

This method can allow requested data to be output after converting the format of data to be output as a search result to the data format that is requested by a data transmission destination, based on the content of a search request made by a search requester.

According to the fourth aspect of this invention, a storage medium having stored a program to be run by a data output system, which is to be connected to data storage means for storing data of plural types of data formats and outputs data from the data storage means, holds programmed procedures of (A) inputting a search request for data stored in the data storage means; (B) searching data stored in the data storage means based on a content of the search request and identifying a data format of a search result; (C) detecting a data format requested by a data transmission destination based on the content of the search request; (D) collating the data format of the search result, identified by the procedure B, with the data format detected by the procedure C; and (E) converting the data format of the search result when the data format of the search request does not match with the data format requested by the data transmission destination.

The program stored in the storage medium can execute a process of outputting requested data after converting the format of data to be output as a search result to the data format that is requested by a data transmission destination, based on the content of a search request made by a search requester.

According to the fifth aspect of this invention, a storage medium having stored a program to be run by a communication terminal for connecting to a data output apparatus connected to data storage means for storing data of plural types of data formats, transmitting a search request for data to the data output apparatus, and acquiring data of plural types of data formats as a search result, the storage medium holding a programmed procedure of transmitting data including at least an address of a communication terminal to which the data is to be output, and a data format outputtable by that communication terminal, as the search request for data stored in the data storage means.

BRIEF DESCRIPTION OF THE DRAWINGS

FIG. 1 is a structural diagram of a communication system to be adaptable to a first embodiment of this invention;

FIG. 3A is a flowchart for a process of a communication terminal when the search requester 8 requests a search for information in the database 1 using any one of the communication terminals 4 to 6 and the search result is returned to any communication terminal other than the search requesting one;

FIG. 3B is a structural diagram of packet data to be set on the network 3 at the time of informing the server 2 of the ability or the like of the search requesting communication terminal;

FIG. 6 is a block diagram of an I/O section 21;

FIGS. 7A and 7B are structural diagrams of a table (A:ID code table 221,B:a program table 222) provided in an access terminal memory 22;

FIG. 18 exemplifies the stored contents of an information providing table 41;

DETAILED DESCRIPTION OF THE PREFERRED EMBODIMENTS

Figure 2A:
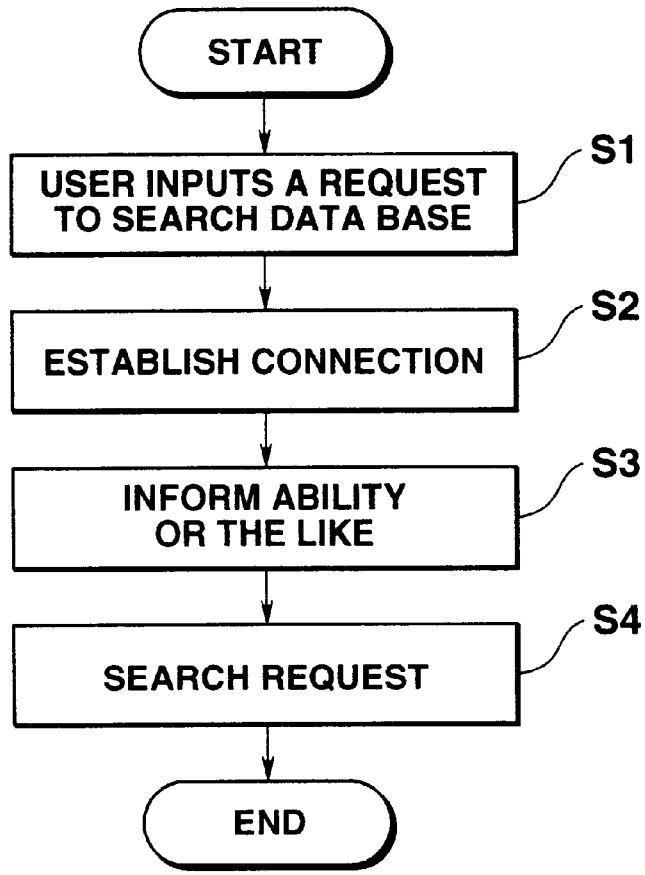
FIG. 2A is a flowchart for a process of a communication terminal when a search requester 8 requests a search for information in a database 1 using any one of communication terminals 4 to 6 and the search result is returned to the search requesting communication terminal.

Preferred embodiments of the present invention will now be described with reference to the accompanying drawings.

FIRST EMBODIMENT

FIG. 1 is a structural diagram of a communication system to be adaptable to a first embodiment.

A database 1 is holding data with various attributes (plural types of data formats), such as image data, text data and voice data.

A server 2, an information processing apparatus, manages the database 1.

The server 2 analyzes a search request sent over a network 3 by a search requester 8, and accesses the database 1 to acquire a search result.

The server 2 sends out the search result to the network 3 after converting the search result to data expressed by another attribute or editing the search result, as needed, in accordance with the ability or functions of a communication terminal at a transmission destination (hereinafter sometimes referred to simply as "destination").

This "conversion" is to convert a search result (data) to another attribute (e.g., from text data to voice data), or to convert data of a predetermined format to data of another format (e.g., from image data of the GIF (Graphics Interchange Format) to image of the JPEG (Joint Photographic Experts Group)).

The "ability or functions of a communication terminal" are a data reception/output capacity indicating, for example, if a communication terminal to which data is to be sent out has an image display function, or has a text display function or has a voice reproducing function.

The network 3 is an existing cable communication infrastructure like a public circuit network (PSTN, ISDN and the like) or LAN.

It is to be noted that the network 3 includes a wireless data communication network, like Data TAC.

According to this embodiment, the communication terminals which are manipulatable by the search requester 8 who requests a search of the database 1 are a PC (Personal Computer) 4, a PDA (Personal Digital Assistant) 5 and a telephone (including a radio telephone) 6.

Another transmission destination of data based on a search result, besides the PC 4, PDA 5 and the telephone 6, is a pager terminal 7.

According to the system of this embodiment, the search requester 8 executes a program, which has been stored in advance in a communication terminal, or which has been written on a portable storage medium (CD-ROM, FDD or the like) and has been installed on the communication terminal 4, 5 or 6, and transmits and reports the ability and functions of the communication terminal, or the destination of the search result to the server 2 at the time of making a search request for information stored in the database 1, by manipulating the communication terminal 4, 5 or 6 connected to the network 3.

The server 2 converts the search result to another data format or edits the search result, as needed, in accordance with the ability or functions of a communication terminal at the destination.

The server 2 transmits the converted or edited search result to the network 3.

This process can allow the communication terminal that has received the search result to surely output the search result.

According to the system of this embodiment, the search requester 8 informs the server 2 of in what data format the search result should be transferred, at the time of requesting a search of the database 1 from any communication terminal 4, 5 or 6 which is connected to the network 3.

In accordance with this request, the server 2 converts the search result obtained from the database 1 to another data format or edits the search result, and then sends out the search result to the associated one of the communication terminals 4–7 over the network 3.

FIG. 2A is a flowchart for a process which is to be executed by the PC 4 or the PDA 5 when the search requester 8 requests a search of the database 1 from the PC 4 or the PDA 5.

In the illustrated case, the search result is returned to the (requesting) communication terminal 4, 5 or 6 that is manipulated by the search requester 8.

When the requesting communication terminal 4, 5 or 6 detects a search request for information in the database 1 being input by the search requester 8 (step S1), the communication terminal establishes connection to the server 2 over the network 3 (step S2).

The communication terminal 4, 5 or 6 (those of the communication terminal through which the search requester 8 has made the search request) informs the server 2 of its own ability and functions via the connection established in step S2 (step S3).

Actually, the requesting communication terminal 4, 5 or 6 reports, as its ability, information such as whether it has an image display function, a text display function, and a voice reproducing function, and the capacity of data that can be stored.

As the equipped functions, the communication terminal 4, 5 or 6 reports the type of an installed image data compression/decompression program (corresponding data format) and the type (corresponding data format) of an application for preparing a document (word processor).

The information on the ability and functions are stored and managed in advance in a predetermined area in the memory equipped in the requesting communication terminal 4, 5 or 6, so that the communication terminal acquires information on its own ability and functions and reports it to the server 2.

In this case, the ability of each communication terminal is reported as a terminal identification (ID) code, while the functions are reported as a program number. The details will be given later.

When the communication terminal 4, 5 or 6 has a plurality of programs installed for image compression/decompression and document preparation, a plurality of program numbers are reported.

Those terminal ID codes and program numbers are commonly defined and used with respect to all the communication terminals which may make search requests to the server 2.

Figure 2B:
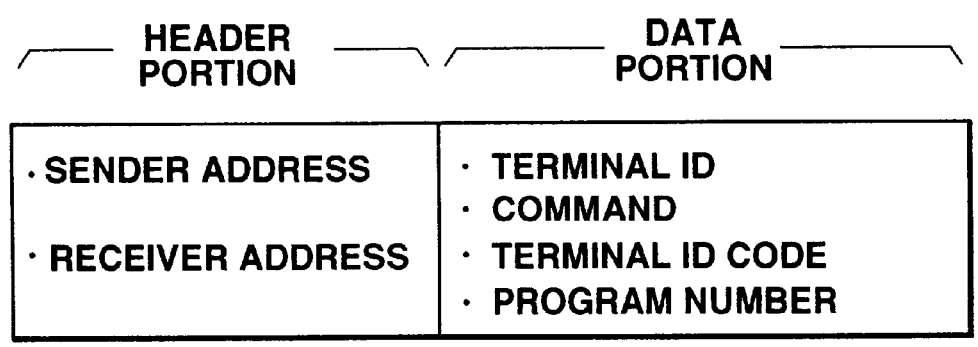
FIG. 2B is a structural diagram of packet data to be set on a network 3 at the time of informing a server 2 of the ability or the like of the search requesting communication terminal.

FIG. 2B is a structural diagram of packet data which is set on the network 3 at the time of informing the server 2 of the ability or the like of the search requesting communication terminal.

The packet data consists of a header portion and a data portion.

A sender address, a receiver address and the like are stored in the header portion.

What systems of addresses are to be stored as the sender address and receiver address is determined by the network structure to which this embodiment is applied.

For example, an IP address is stored in TCP/IP communication, and specifically set information for communication establishment (e.g., a telephone number or a call number) is stored for the ISDN, public circuit network or radio telephone communication network.

In the data portion are stored a command, a terminal ID, a terminal ID code and a program number or the like.

A command instructs a process which is executed by a search-requested terminal (server 2).

A search for information which is stored and managed in the database 1 is illustrated as such a command in this embodiment, but it is in no way restrictive, and any type of command can of course be used as long as the server 2 can execute it by using a program (e.g., CGI) which has been described by codes of a network language like Java.

The terminal ID is an ID number of the local communication terminal (search requester).

The terminal ID code represents the aforementioned ability of the local communication terminal.

The program number represents the aforementioned function that the local communication terminal can carry out.

When connection to the server 2 is established, the requesting communication terminal 4, 5 or 6 requests the server 2 to make a search by informing the contents of the search request, such as the search range and a keyword (step S4).

In this flowchart, the processing order of the step S3 and step S4 may be reversed. Depending on the system structure of the network 3, reporting the ability or the like of the local communication terminal and the search request may be carried out simultaneously, or information indicating the ability or the like may be included in part of packet data (data portion).

Although the flowchart illustrated in FIG. 2A is premised on that the search result is returned to the search requesting communication terminal, the result of the search requested of the server 2 can be sent not to the search requesting communication terminal but to other communication terminals than the requesting one.

For example, the PC 4 may make a search request to the server 2, and the server 2 may send out the search result to the PDA 5 or the pager terminal 7.

If the contents of the search request compel the server 2 to take time, or if the network 3 has a time restriction in establishing the connection and a command or the like in the data portion indicates that the search requester 8 wants to quickly know whether or not the search has been completed, the server 2 may send only information indicating the end of searching, not the search result itself, to the designated communication terminal.

Note that the header portion should have the address of the destination to which a report should be made (hereinafter referred to as "reporting destination"), in addition to the sender address and receiver address. In FIG. 1, for example, the sender address and the receiver address are the PC 4, and the reporting address is the pager terminal 7.

Figure 4:
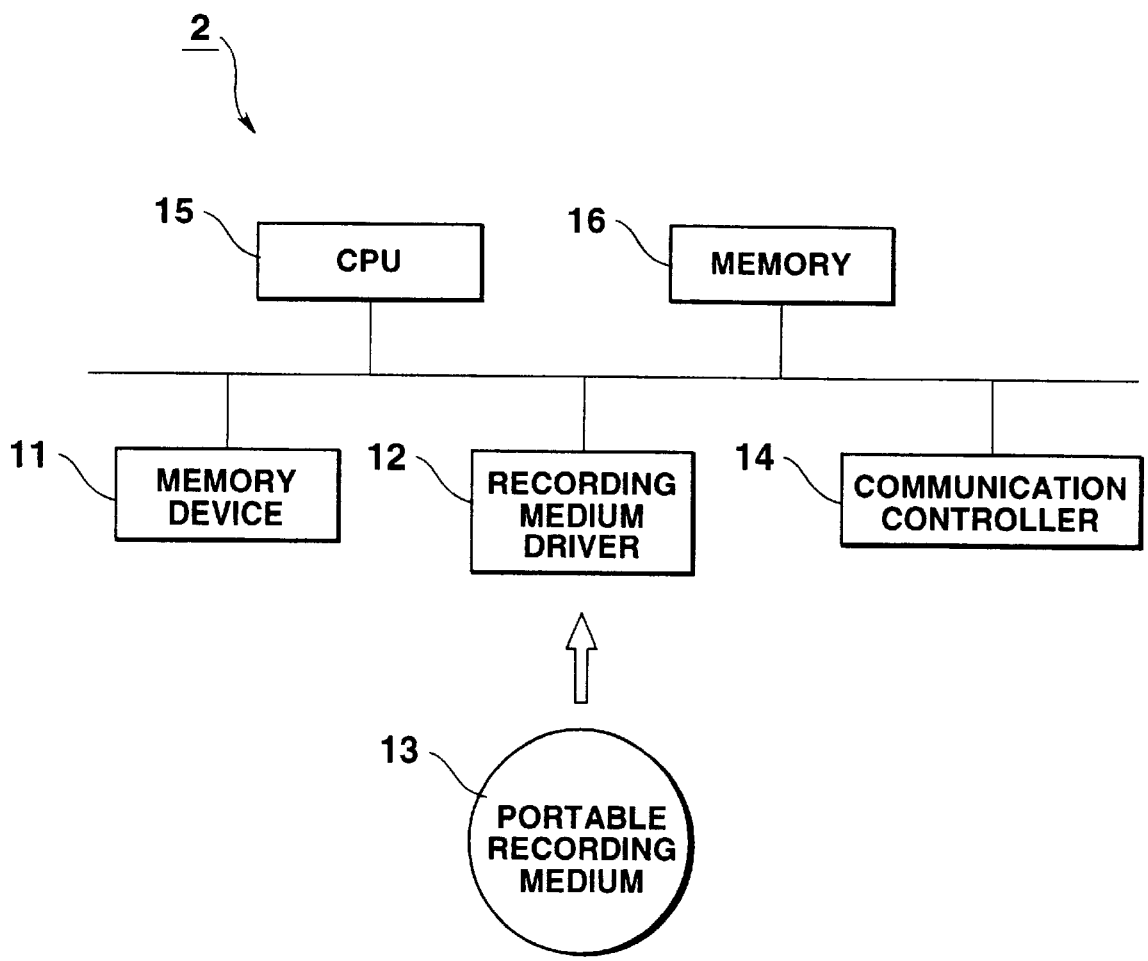
FIG. 4 is a hardware structural diagram of the server 2 according to the first embodiment.

The server 2 has a function of sending the end of searching to the communication terminal at the reporting destination and temporarily holding the search result until the connection to the communication terminal to which the search result is to be sent is established (storing the search result in a predetermined and associated memory area in a memory device 11 in FIG. 4).

Because a scheme of reporting the end of a process in one of two different communication circuit networks via the other communication circuit network, which is of course needed in this embodiment, is well known, the description of this scheme will not be given.

FIG. 3A is a flowchart for a case where the result of a search request made by one communication terminal (any one of terminals 4 to 6) is sent to any communication terminal other than the search requesting one.

In FIG. 3A, steps S1, S2 and S4 are the same as those illustrated in FIG. 2A. In step S11, the search requesting communication terminal informs the server 2 of information specifying the communication terminal to which the search result should be sent and the ability or the like of this communication terminal at the transmission destination.

Those informations are sent to the server 2 by the search requester 8 manipulating the communication terminal.

As information of the communication terminal at the transmission destination, for example, the address, telephone number or the like of this communication terminal and information necessary to establish connection to the communication terminal are input.

The ability or the like of the communication terminal at the transmission destination, which is to be input, is the type of the communication terminal (PC, PDA, telephone or pager).

The function of the communication terminal at the transmission destination is input if possible. The structure of a packet, which is generated in step S11, is shown in FIG. 3B.

FIG. 4 is a structural diagram of the server 2.

The memory device 11 is comprised of a semiconductor memory, a magnetic recording medium or an optical recording medium, and is holding a program and data or the like which are associated with this embodiment.

The memory device 11 may be permanently provided in the server 2, or may be attached thereto in a detachable manner.

A recording medium driver 12 reads data from a portable recording medium 13 (such as a semiconductor memory, a magnetic disk, an optical disk or an magneto-optical disk) or writes data in the portable recording medium 13.

A communication controller 14 is a unit for controlling data exchange with the network 3.

A CPU 15 loads a program or the like from the memory device 11 or the portable recording medium 13 into a memory 16 and executes the program.

The program and data or the like to be stored in the memory device 11 may be what has been stored in the portable recording medium 13, or may be those which are received from another unit on the network via a communication line.

The CPU 15 may load a program or the like from another memory device, located on the network, over the communication line.

Figure 5:
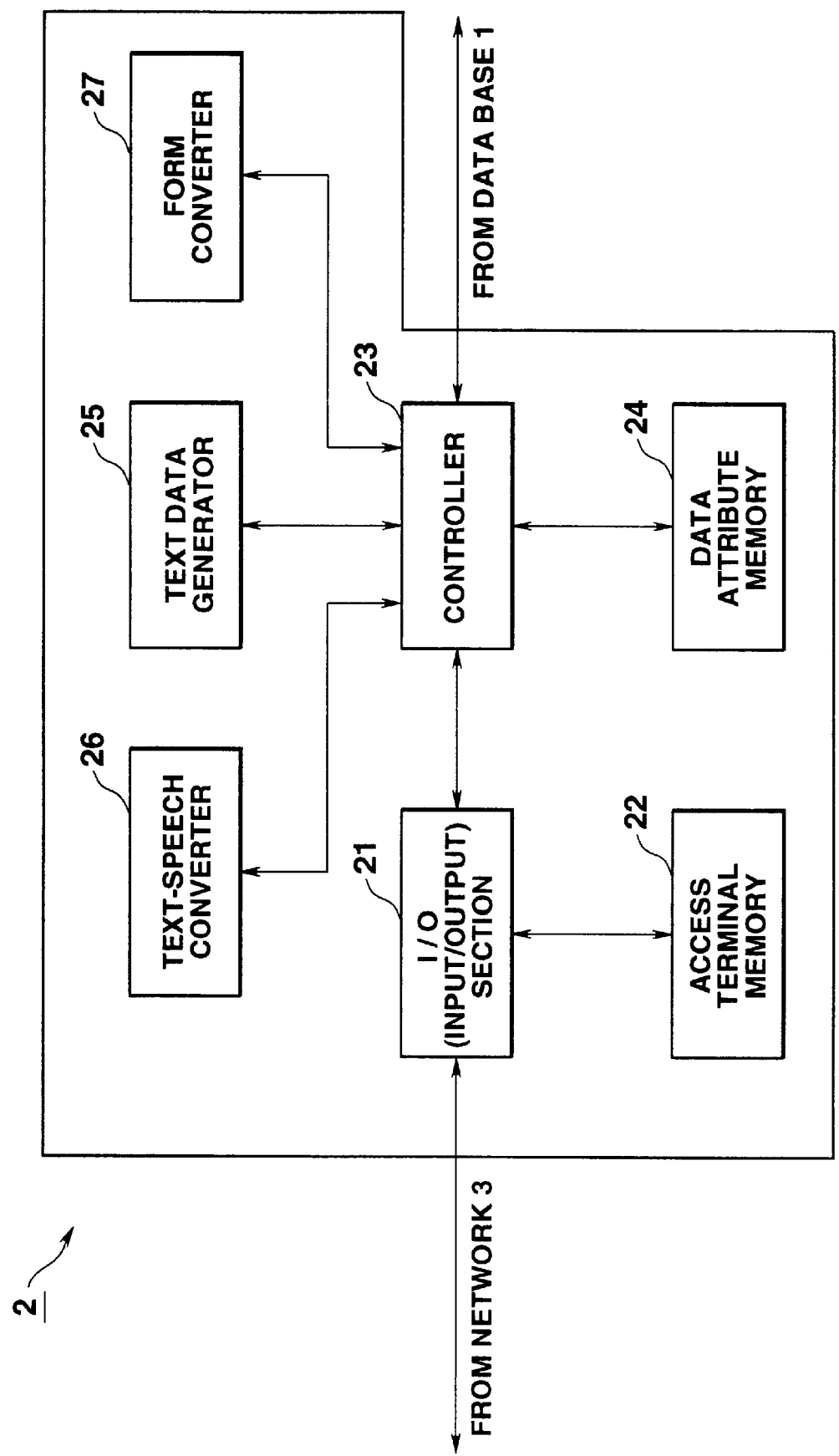
FIG. 5 is a block structural diagram of the server 2 according to the first embodiment.

FIG. 5 is a block diagram of the server 2.

An input/output (I/O) section 21 receives data transferred over the network 3, transfers it to a controller 23, and sends data to the network 3 in accordance with an instruction from the controller 23.

FIG. 6 presents the detailed blocks of the I/O section 21.

The I/O section 21 has a data port 31 and a telephone port 32 and separately executes data exchange with a communication terminal, such as the PC 4 or PDA 5, and data exchange with the telephone 6.

An I/O controller 33 supplies data, input via the data port 31 or telephone port 32, to the controller 23, and sends data to the network 3 via the data port 31 or telephone port 32 in accordance with an instruction from the controller 23.

A collation section 34 accesses an access terminal memory 22 in accordance with data supplied via the data port 31 or telephone port 32 and performs collation to identify the ability and function of the communication terminal to which the search result should be sent.

The collation section 34 then transfers the result of the function identification to the controller 23 via the I/O controller 33.

A guidance section 35 stores voice guidance messages for giving guidance to the search requester 8 when the requester 8 makes a search request via the telephone 6, and sends out a voice message to the network 3 via the telephone port 32 in accordance with an instruction from the controller 23.

The access terminal memory 22 stores a terminal ID code and a program number, which have been discussed earlier with reference to FIGS. 2 and 3, in association with the ability and function of the associated communication terminal.

FIG. 7A is a structural diagram of an ID code table 221 provided in the access terminal memory 22.

In the ID code table 221, individual terminal ID codes are stored in association with the abilities of the communication terminals.

For example, the ID code table 221 shows that a communication terminal whose terminal ID code is "101" is a personal computer and has an image display function, a voice reproducing function and a text display function, with 2 MB indicated as the storage capacity for data on the search result.

FIG. 7B is a structural diagram of a program table 222 provided in the access terminal memory 22.

In the program table, each program number, an OS (Operating System) which the associated communication terminal can invoke, and an application program (which is normally installed in that communication terminal or bundled at the time of installing the OS) are stored in association with one another.

The terminal ID codes and program numbers shown in FIG. 7 correspond to the terminal ID codes and program numbers which have been explained referring to FIG. 2 or 3. That is, the correlations set in the ID code table 221 and program table shown in FIG. 7 have previously been stored in each communication terminal (PC 4 or PDA 5).

Since each communication terminal is retaining data on its ability and an OS and a program, both installed in itself, the communication terminal informs the server 2 of its own ability and function using the terminal ID code and program number in step S3 in FIG. 2 (or step S11 in FIG. 3).

Upon reception of the terminal ID code and program number from each communication terminal, the server 2 can know the terminal ID code and program number of the communication terminal to which the search result should be sent (or maybe the communication terminal of the search requester) by referring to the access terminal memory 22.

The controller 23 analyzes the search request input via the I/O section 21 and accesses the database 1 to acquire the search result.

Figure 8:
FIG. 8 is a structural diagram of a data attribute memory 24.

Further, the controller 23 refers to a data attribute memory 24 shown in FIG. 8 to detect the attribute of data acquired from the database 1 as the search result The "data attribute" represents if each data in the database 1 is stored as image data, voice data or text data.

Figure 9:
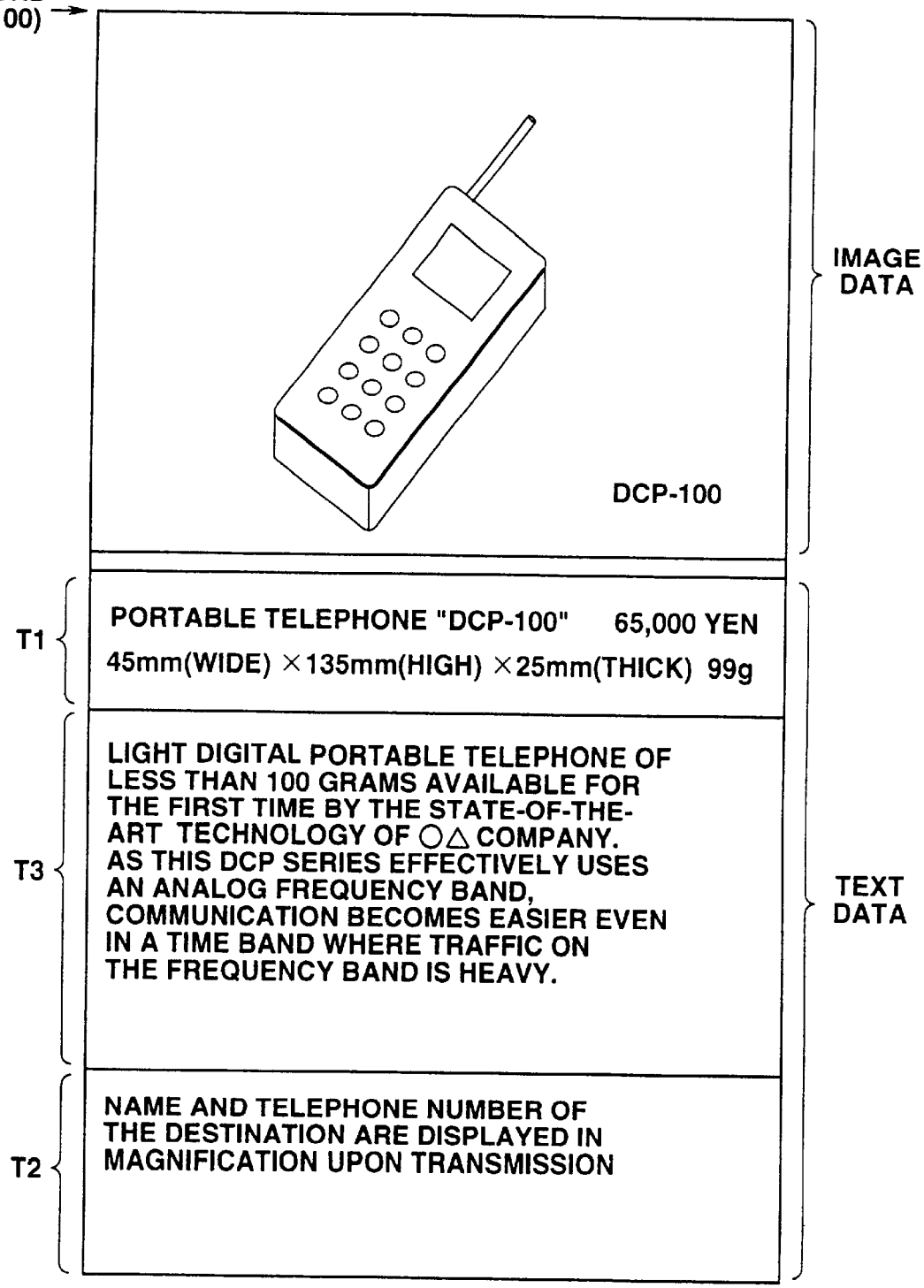
FIG. 9 shows one example of data (information) stored in the database 1.

When image data is stored together with text data associated with that image data as shown in FIG. 9, the data attribute becomes "image+text."

Further, the controller 23 works with a text data generator 25, a text-speech converter 26 and a compression form converter 27 as needed to perform a predetermined process on data acquired from the database 1 as the search result, so that the search result can be sent to the communication terminal at the transmission destination.

When the search result is image data and the communication terminal to which the search result should be sent (the transmission destination) does not have an image display function, for example, the controller 23 extracts text data associated with that image data and sends that text data as the search result.

When the search result is text data whose amount exceeds the capacity of the communication terminal at the transmission destination, the text data generator 25 edits that text data in such a way that the amount of the text data falls within the capacity of the destination's communication terminal.

When the search result is text data and the communication terminal at the transmission destination has only a voice reproducing function, such as a telephone having no display device, the text-speech converter 26 converts the text data to voice data.

When the search result is image data compressed by a predetermined system (e.g., JPEG or GIF) and only an image compression/decompression program of another system is installed in the communication terminal at the transmission destination, the compression form converter 27 decompresses the image data and compresses again the resultant image data by the system of the program installed in the destination's communication terminal.

The text data generator 25 converts and edits text data in accordance with an instruction from the controller 23.

The text-speech converter 26 converts text data to voice data in accordance with an instruction from the controller 23.

The compression form converter 27 converts the data compression form in accordance with an instruction from the controller 23.

The I/O section 21 is realized as functions of the program that are executed by the communication controller 14 and CPU 15 in FIG. 4.

The controller 23, the text data generator 25, the text-speech converter 26 and the compression form converter 27 are realized as functions of the program that are executed by the CPU 15 in FIG. 4.

The access terminal memory 22 and the data attribute memory 24 are set inside the memory 16 in FIG. 4.

Figure 10:
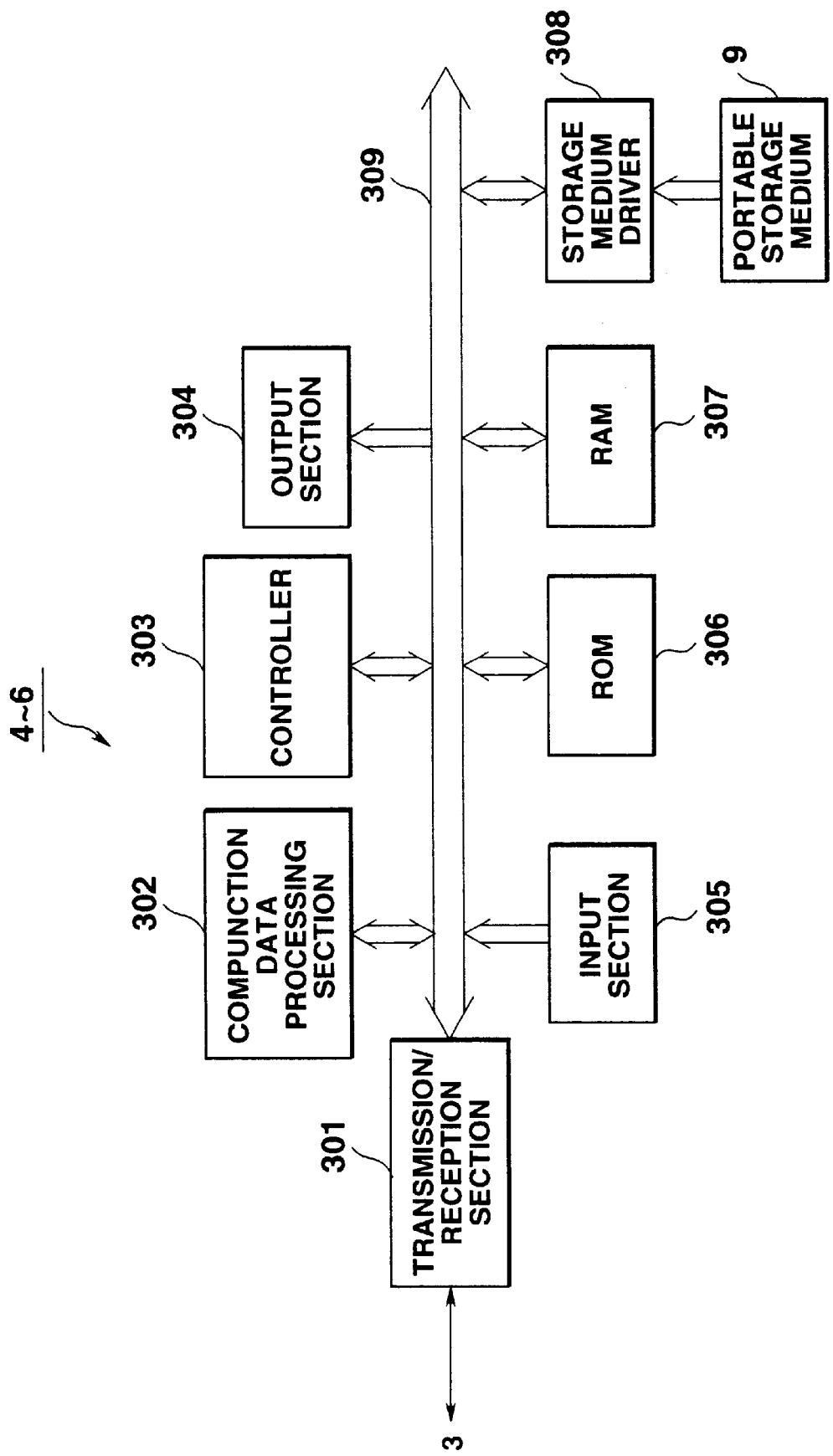
FIG. 10 is a circuit structural diagram of communication terminals (PC 4, PDA 5 and telephone 6) which are connected via the network 3.

FIG. 10 is a circuit structural diagram of communication terminals (PC4, PDA5 and telephone 6) which are connected via the network 3.

The conceptual structures of individual circuits 301 to 309 will be discussed specifically, though the details would differ depending on the ability, functions and capacity of each communication terminal.

"301" is a transmission/reception section, which transmits a packet as shown in FIGS. 2B and 3B, receives data on the search result and decodes the data.

This section 301 corresponds to a cable/radio modem installed with a DSP, or may be a portable telephone or the like which has a DSP function can output data.

"302" is a compunction data processing section, which converts data, decoded by the transmission/reception section 301, to a data stream that can be processed by the communication terminal (PC 4, PDA 5 or telephone 6).

More specifically, when data multiplexed or encoded in accordance with the protocol specified for the network 3 is received, conversion which is performed by the communication data processing section 302 executes demultiplexing or decryption using a public key.

"303" is a controller which performs the general control of the communication terminal based on the control contents given by the OS and application program stored in a ROM 306, and sends the results to an output section 304, the communication data processing section 302, etc.

When the search requester 8 connects the portable storage medium 9 to a storage medium driver 308, the controller 303 reads the program stored in the portable storage medium 9 and writes it in the ROM 306 (EEPROM in this embodiment), and loads the program in accordance with an instruction given by the search requester 8.

The output section 304 outputs the results of a process executed by the controller 303, in response to a control signal from an input section 305.

Specifically, for a communication terminal adapted for an Internet browser, the output section 304 is a display (CRT or liquid crystal device) having a resolution of the VGA or XGA class for an image output, or is capable of outputting stereo sounds for a voice output.

Specifically, the input section 305 corresponds to a keyboard, a mouse or another kind of pointing device.

The input section 305 may also correspond to a pickup device like CCD or a voice input device like a microphone.

The ROM 306 has a hardware structure of an EEPROM.

Stored and managed in the ROM 306 are the OS or application program which is invoked by this communication terminal, and specific information, such as the terminal ID, the terminal ID code and program number of the communication terminal and addresses which designate the communication terminal at the transmission destination and the receiver.

"307" is a RAM which temporarily stores data to be output from the output section 303 or stores the search result based on data from the server 2.

The storage medium driver 308 reads out data from the portable recording medium 9 (such as a semiconductor memory, magnetic disk, optical disk or magneto-optical disk) or writes data in the portable recording medium 9.

"309" is a bus, which connects the individual circuits 301 to 308 in each communication terminal.

Figure 11:
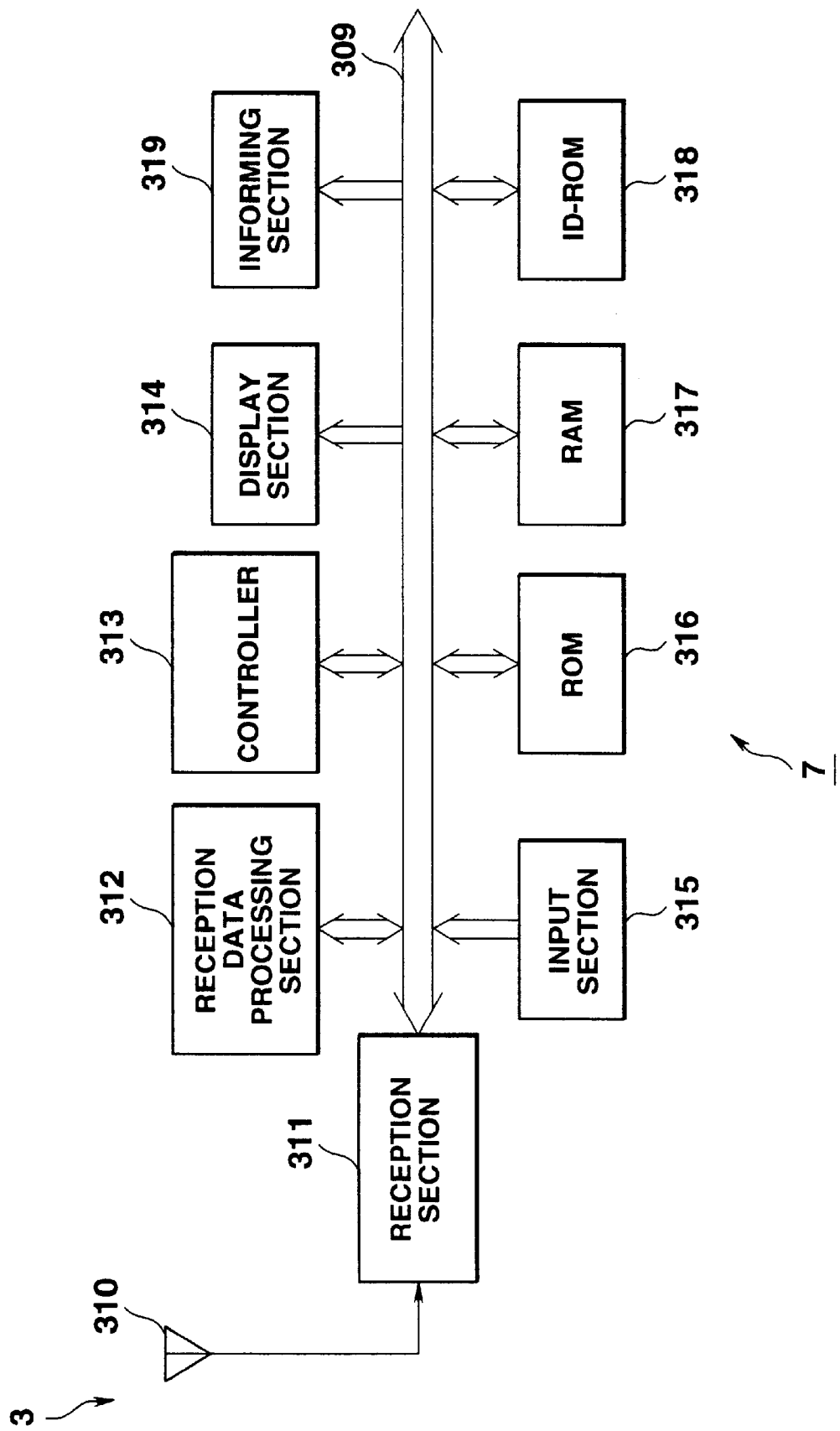
FIG. 11 is a circuit structural diagram of a pager terminal 7 which receives data that is radio-transmitted over the network 3.

FIG. 11 presents a circuit structural diagram of the pager terminal 7 which is connected via the network 3.

A reception section 311 receives data, radio-transmitted over the network 3 (including a paging system), via an antenna 310 and decodes the data.

A reception data processing section 312 converts the data decoded by the reception section 311 to a data stream which can be processed by the pager terminal 7.

A controller 313 performs the general control of the pager terminal 7 based on a program stored in a ROM 316, and outputs the result to a display section 314.

The display section 314 displays the result of a process executed by the controller 313, based on control signals from an input section 315 and the reception data processing section 312.

When the pager terminal 7 has a voice paging function, the display section 314 may be replaced with a speaker capable of sending out voices.

Specifically, the input section 315 corresponds to a key input section having a plurality of push switches.

The ROM 316 has a hardware structure of an EEPROM.

Information stored and managed in the ROM 316 includes a program which is invoked by the pager terminal 7, and information, such as the terminal ID, the terminal ID code and program number of the pager terminal 7 and an address which designates the receiver.

"317" is a RAM which temporarily stores data to be output by the display section 313 or stores the search result based on data from the server 2.

"318" is an ID-ROM which stores and manages specific information, such as a call address specifically set to the pager terminal 7.

"319" is an informing section, which may include an LED, a speaker or a vibrator. An incoming call is informed by light emission from the LED, a tone generation from the speaker and/or the vibration of the vibrator.

A description will now be given of the operation from reception of a search request from the search requester 8 to the outputting of the search result.

Figure 12:
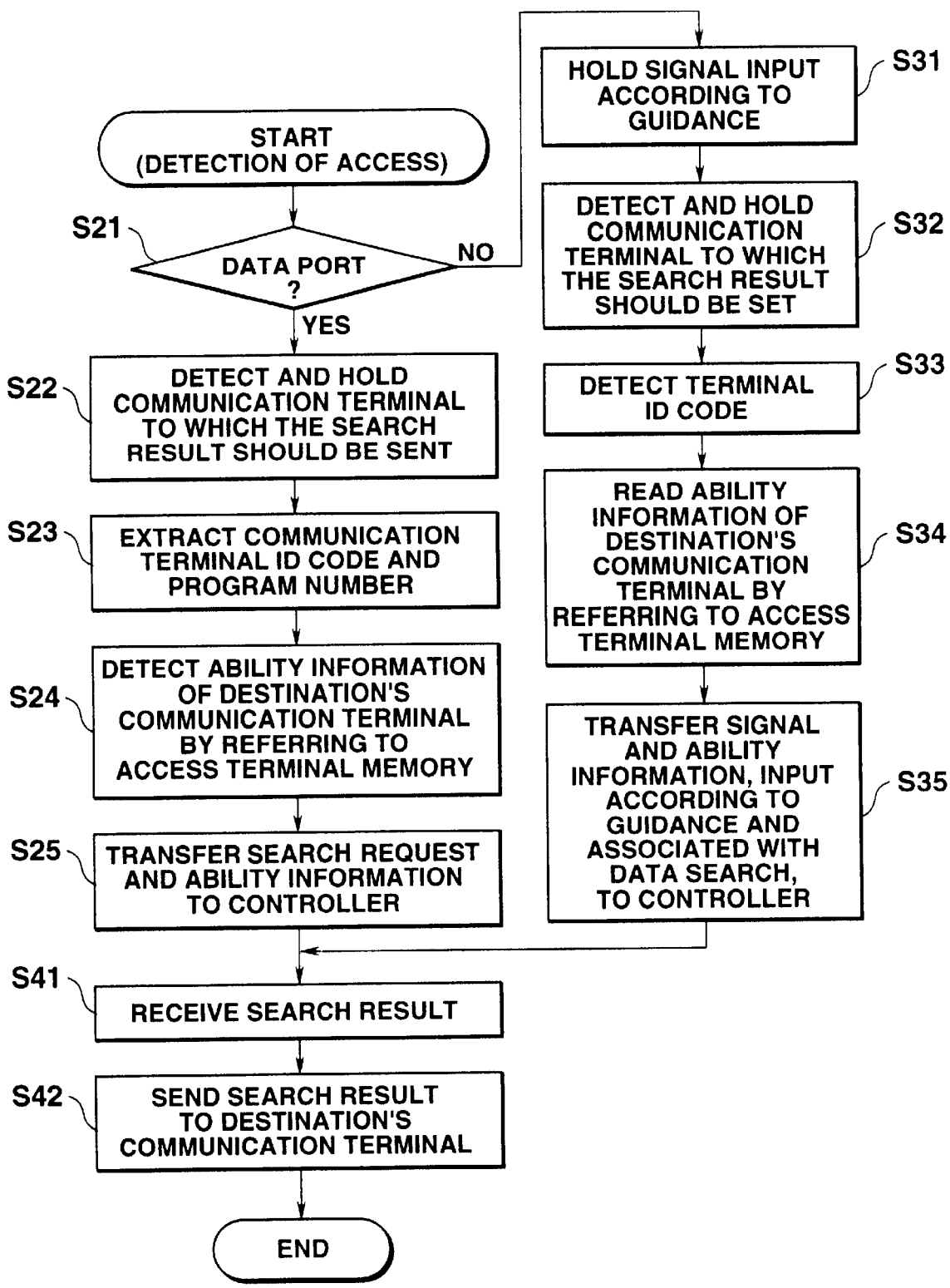
FIG. 12 is a flowchart for explaining the operation that is performed by the I/O section 21.

FIG. 12 is a flowchart for explaining the operation of the I/O section 21. This flowchart illustrates the operation of the I/O section 21 that begins upon reception of a search request which has been issued to the server 2 by a searcher using the telephone 6.

The I/O section 21 determines whether access over the network 3 has been made via the data port 31 or the telephone port 32 (step S21).

When having determined in step S21 that access has been made via the data port 31, the I/O section 21 considers that the searcher has issued the search request by using the PC 4 or the PDA 5, and then detects, from the received packet, information that specifies the communication terminal to which the search result should be sent, and holds the information (step S22).

Specifically, the I/O section 21 holds the "terminal ID" stored in the data portion in the case shown in FIG. 2, and holds the "ID of the communication terminal at the transmission destination" in the case shown in FIG. 3.

The "terminal ID code" and "program number" are extracted from the received packet (step S23).

In other words, since the PC 4 or PDA 5 informs the server 2 of the terminal ID code and program number of the communication terminal to which the search result is to be sent in step S3 in FIG. 2 or step S11 in FIG. 3, the server 2 extracts the terminal ID code and program number from the packet that retains the information on this report.

Then, the I/O section 21 detects ability information of the communication terminal where the search result is to be sent by referring to the access terminal memory 22 (step S24).

Specifically, the I/O section 21 accesses the ID code table 221 shown in FIG. 7A using the extracted terminal ID code as a key, to thereby recognize the ability of the communication terminal where the search result is to be sent, or the I/O section 21 accesses the program table shown in FIG. 7B using the extracted program number as a key, to thereby recognize the OS and application program installed on that communication terminal.

The I/O section 21 transfers the search request, received over the network 3, together with the ability information of the communication terminal at the transmission destination (step S24).

Thereafter, the I/O section 21 waits for the search result to be transferred from the controller 23.

When the I/O section 21 determines in step S21 that an input was made through the telephone port 32, on the other hand, the I/O section 21 considers that the searcher has issued the search request using the telephone 6, and detects and holds signals coming from that communication terminal (step S31).

That is, to request the server 2 for a search using the telephone 6, the search requester 8 manipulates the telephone 6 and informs the server 2 of the keyword, the communication terminal where the search result should be sent, and the ability or the like of the communication terminal at the transmission destination, by pushing predetermined push-dial buttons in accordance with the voice guidances sent from the server 2.

The I/O section 21 receives and retains the signals input by the telephone 6.

The I/O section 21 detects the communication terminal at the transmission destination for the search result from the signals retained in step S31, and holds the signals (step S32).

Where there is no designation of the transmission destination, the communication terminal that has requested the search is treated as the communication terminal at the transmission destination.

The I/O section 21 detects the terminal ID code of the communication terminal at the transmission destination from the signals held in step S31 (step S33).

The I/O section 21 reads out the ability information of the communication terminal at the transmission destination from the access terminal memory 22 (step S34) as in step S24.

Then, the I/O section 21 transfers the signal representing the keyword, input in accordance with the voice guidances, and the ability information of the communication terminal at the transmission destination, detected in step S34, to the controller 23 (step S35).

Thereafter, the I/O section 21 waits for the search result to be transferred from the controller 23.

The I/O section 21 receives the search result from the controller 23 (step S41).

Then, the I/O section 21 sends the search result to the communication terminal at the transmission destination that has been detected in step S22 or step S32 (step S42).

Figure 13:
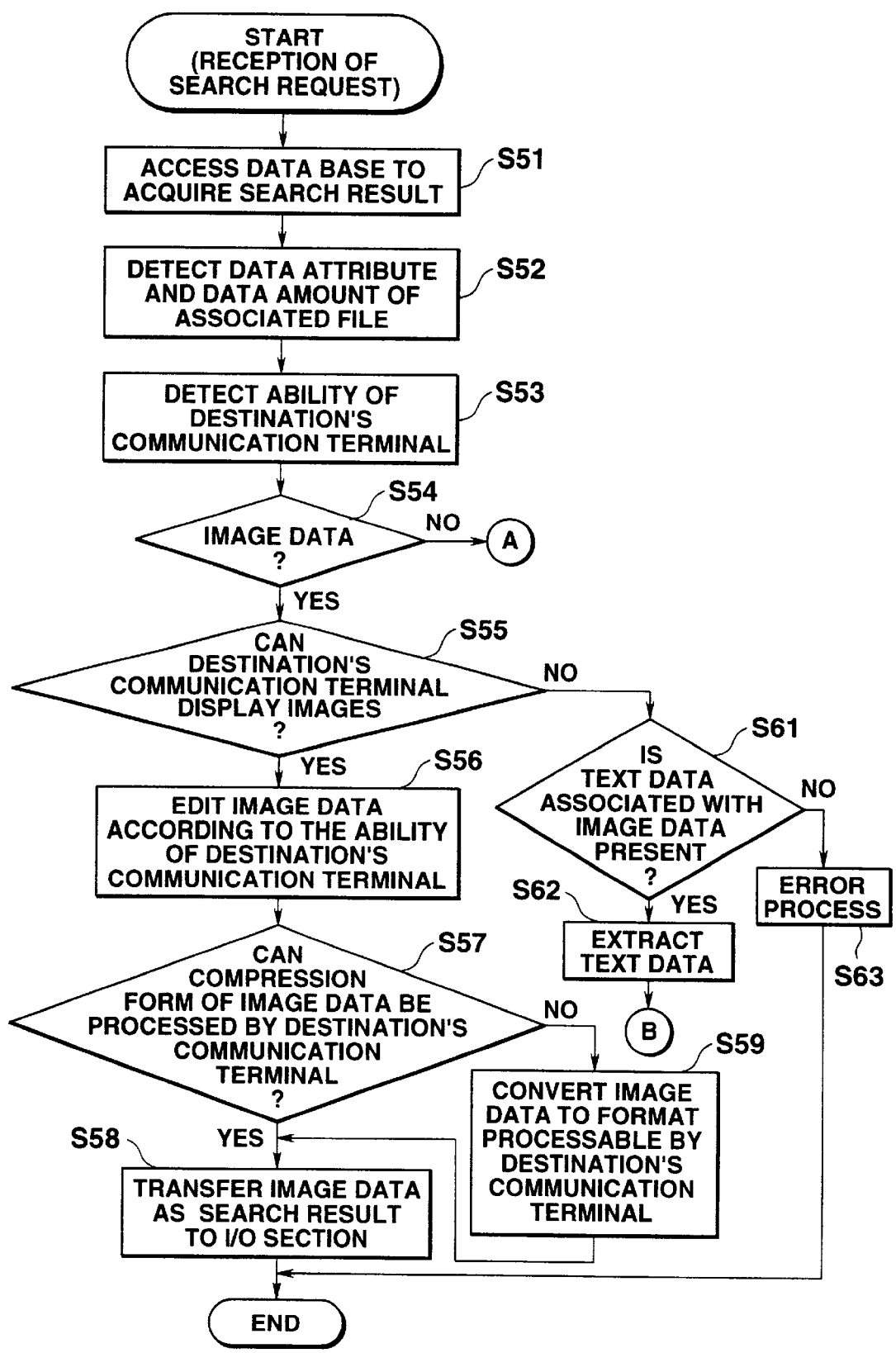
FIG. 13 is a flowchart for explaining the operation that is executed by a controller 23.
Figure 14:
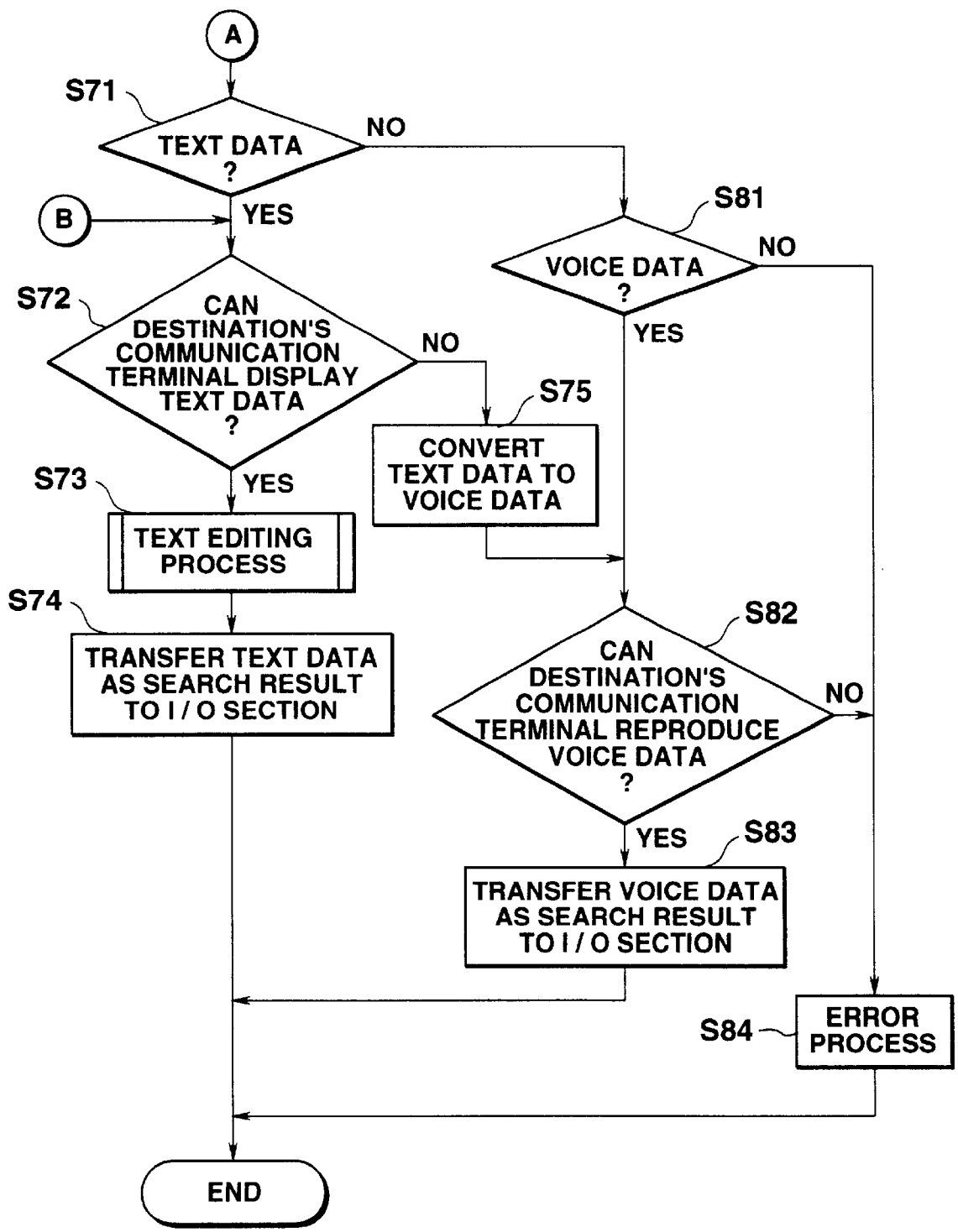
FIG. 14 is a flowchart for explaining the operation that is executed by the controller 23.

FIGS. 13 and 14 illustrate a flowchart for explaining the operation of the controller 23. This flowchart includes the operations of the text data generator 25, the text-speech converter 26 and the compression form converter 27.

The controller 23 accesses the database 1 to acquire the search result (step S51).

The search result to be obtained there is image data, text data or voice data, or a combination of those data.

The controller 23 refers to the data attribute memory 24 shown in FIG. 8 to detect the attribute of data that has been obtained as a result of searching database 1 (step S52).

Then, the controller 23 detects the ability of the communication terminal to which the search result is to be sent, based on the ability information received from the I/O section 21 (step S53).

The controller 23 determines if the search result includes image data (step S54). When having determined that the search result includes image data, the I/O section 21 determines if the communication terminal at the transmission destination can display image data (step S55).

Note that image data is stored, compressed in a predetermined compression form, in the database 1.

When the communication terminal at the transmission destination is capable of displaying image data, the controller 23 edits the image data according to the ability of that communication terminal (step S56).

When the communication terminal at the transmission destination has a low image display performance, for example, the controller 23 thins the image data to reduce the amount of data at the price of the reduced resolution.

If the communication terminal does not have a color display function, the controller 23 removes color information or the like.

The controller 23 then proceeds to step S57 to determine if the image data can be processed (decompressed) in the communication terminal at the transmission destination.

When having determined in step S57 that the image data is processable, the controller 23 transfers the image data to the I/O section 21 (step S58).

When having determined in step S57 that the communication terminal at the transmission destination cannot process the image data, the controller 23 converts (recompresses) the image data, acquired from the database 1, to a form that is processable in the destination's communication terminal (step S59).

The process in step S59 is executed by the compression form converter 27.

When the communication terminal at the transmission destination has no image compression/decompression function, the controller 23 transfers decompressed image data to the I/O section 21.

When it is determined in step S55 that the communication terminal at the transmission destination cannot display image data, the controller 23 determines if there is text data associated with the image data (step S61).

It is assumed that, as shown in FIG. 9, basically, image data and text data (an abstract or the like of image data) as explanation statements associated with that image data are stored in this embodiment.

When it is determined in step S61 that there is text data associated with image data, the controller 23 extracts the text data (step S62) and then proceeds to step S72.

When it is determined in step S61 that there is no text data associated with image data, the controller 23 executes an error process to output text data to such an effect that "the search result cannot be output" (step S63).

When having determined in step S54 that the search result does not include image data, the controller 23 determines if the search result is text data (step S71).

When having determined in step S71 that the search result is text data, the controller 23 determines if the communication terminal at the transmission destination can display text data (step S72).

When having determined in step S72 that the communication terminal is able to display text data, the controller 23 executes a text editing process (step S73) and transfers the resultant text data to the I/O section 21 as the search result (step S74).

The text editing process in step S73, which is executed by the text data generator 25, will be described later specifically.

When having determined in step S72 that the communication terminal at the transmission destination cannot display text data, the controller 23 converts the text data to voice data (step S75) and then proceeds to step S82.

The process in step S75 is executed by the text-speech converter 26. Note that a known scheme is used to convert text data to voice data.

When the controller 23 has determined in step S71 that the search result is not text data, the controller 23 then determines if the search result is voice data (step S81).

When having determined in step S81 that the search result is voice data, the controller 23 determines the communication terminal at the transmission destination can reproduce voice data (step S82).

When having determined in step S82 that the communication terminal can reproduce voice data, the controller 23 transfers the voice data to the I/O section 21 as the search result (step S83).

When having determined in step S81 that the search result is not voice data, the controller 23 determines that the search result is none of an image, text and voices, and executes an error process of making a voice announcement, for example, "the search result cannot be output" (step S84). When having determined in step S82 that the communication terminal at the transmission destination cannot reproduce voice data, the controller 23 executes an error process of outputting a buzzer sound from the communication terminal (step S84).

Figure 15:
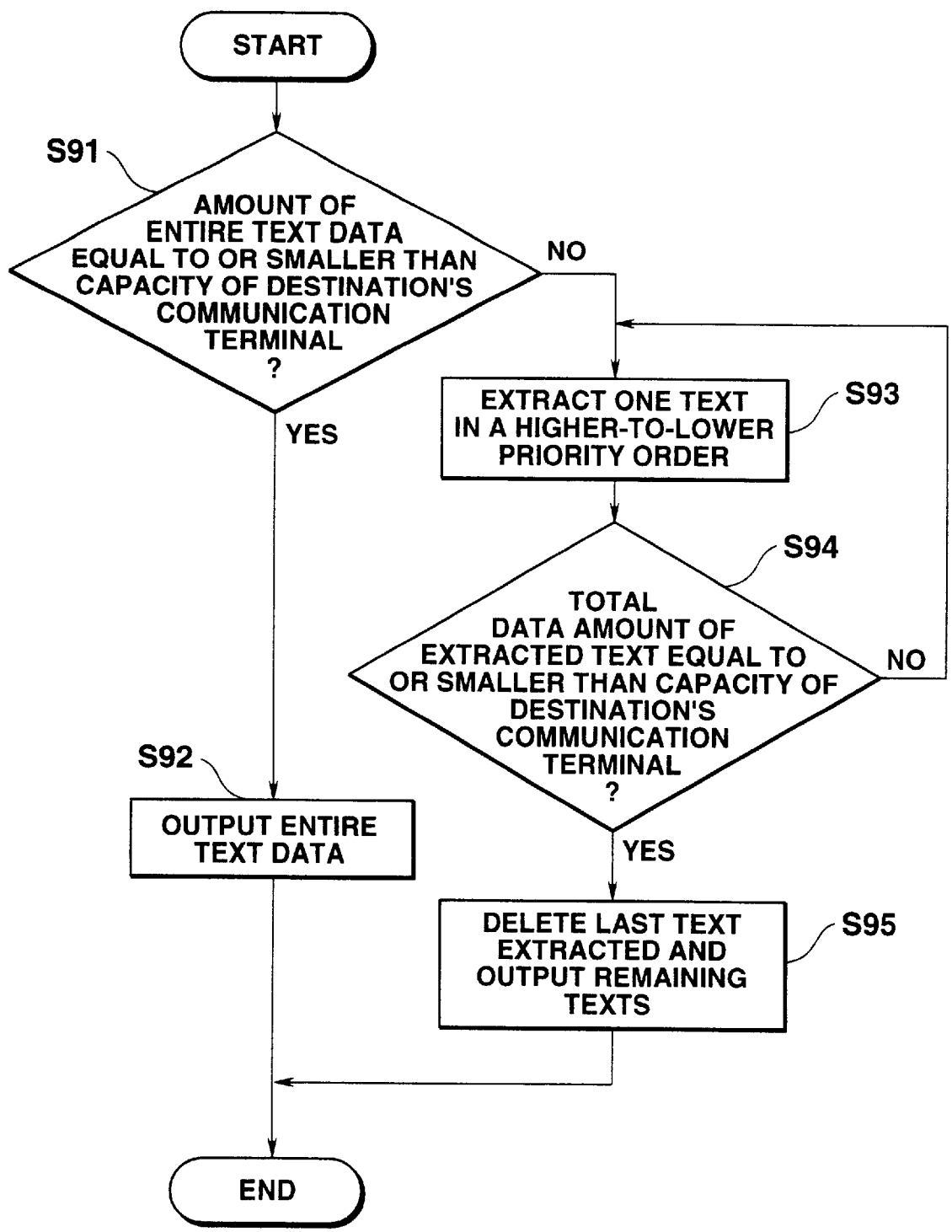
FIG. 15 is a sub flowchart of a text editing process (step S73)

FIG. 15 is a flowchart for the text editing process.

The text editing process edits text data in such a way that the text data can be displayed on a communication terminal to which the text data should be sent.

It is to be noted that individual texts or paragraphs included in text data are given priorities respectively.

It is determined if the amount of the whole text data acquired from the database 1 (which includes text data associated with image data acquired in step S62) is equal to or smaller than the capacity of the communication terminal to which the search result should be sent (step S91).

When it is determined in step S91 that the amount of the text data is equal to or smaller than the capacity, the entire text data is output (step S92).

When it is determined in step S91 that the amount of the text data exceeds the capacity, the following process is executed.

First, one text or paragraph, which has the highest priority, is extracted from the text data (step S93).

It is then determined if the total data amount of the text or paragraph extracted in step S93 acquired is equal to or smaller than the capacity of the communication terminal to which the search result should be sent (step S94). When it is determined in step S94 that the total amount is not greater than the capacity, the flow returns to step S93 and other texts or paragraphs are extracted one after another in the higher-to-lower priority order until the total data amount of the extracted texts or paragraphs exceeds the capacity of the communication terminal at the transmission destination.

When it is determined in step S94 thereafter that the total data amount of the extracted texts or paragraphs exceeds the capacity of the communication terminal at the transmission destination, the text or paragraph that has been extracted last is deleted and the resultant texts or paragraphs are output (step S95).

In the example illustrated in FIG. 9, for example, text data is separated into three areas which are respectively given priorities T1 to T3.

When the amount of the entire text data is equal to or smaller than the capacity of the communication terminal to which the search result should be sent, T1 to T3 are output. That is, the entire texts are output.

When the amount of the entire text data is greater than the capacity of the communication terminal at the transmission destination, the text with the highest priority, "Portable telephone . . . 99 grams," is extracted.

At this time, when the amount of text data belonging to T1 is equal to or smaller than the capacity of the communication terminal at the transmission destination, the text with the second highest priority or the text belonging to T2 is extracted.

When the amount of text data belonging to T1 and T2 is equal to or smaller than the capacity of the communication terminal at the transmission destination, the text data belonging to T2 is deleted and only the text data belonging to T1 is output. That is, only the following texts are output.

Portable telephone "DCP-100" 65,000 yen 45 mm (wide)×135 mm (high)×25 mm (thick) 99 g When the amount of text data belonging to T1 and T2 is equal to or smaller than the capacity of the communication terminal at the transmission destination, the text data belonging to T3 is also extracted and it is determined if the amount of text data belonging to T1 to T3 is equal to or smaller than the capacity of the communication terminal at the transmission destination.

When the amount of the text data exceeds the capacity of the communication terminal at the transmission destination, the text data belonging to T3 is deleted and only the text data belonging to T1 and T2 are output. That is, the following texts are output.

Portable telephone "DCP-100" 65,000 yen 45 mm (wide)×135 mm (high)×25 mm (thick) 99 g Name and telephone number of the destination are displayed in magnification upon transmission In a case where information on whether the communication terminal to which the search result should be sent has a function of processing and displaying Kanji characters is reported too as ability information of the communication terminal at the transmission destination at the time of sending a search request to the server 2, a Kanji/Kana conversion process is provided after step S92 or step S95.

Accordingly, when it is detected that the communication terminal to which the search result should be sent has a function of processing and displaying Kanji characters, the text data generator 25 converts Kanji characters included in text data to be sent to Katakana alphabets.

Upon acquisition of the search result from the database 1, the server 2 determines if the communication terminal at the transmission destination can output the search result. When the search result cannot be output, the server 2 process data (search result) by performing conversion of the data format (data attribute), conversion of the compression form, text edition, etc. so that the communication terminal at the transmission destination can output the search result.

Although this embodiment processes image data in accordance with the image processing program installed on the communication terminal to which that image data should be sent, at the time of sending image data, this scheme may be adapted for text data.

Specifically, this embodiment may be modified in such a way that the type of the document preparing application software installed on the communication terminal to which the search result should be sent is reported to the server 2 as ability information of the communication terminal at the transmission destination at the time of sending a search request to the server 2, and at the time of sending text data, the server 2 converts the text data to the format of the document preparing application installed on the communication terminal at the transmission destination.

While this embodiment deals with image data, image data includes motion pictures as well as still pictures in this invention.

Further, this invention is not limited to retrieval of information stored in a database, and covers every structure wherein, when one communication terminal request another to send data, the communication terminal which has received the request processes data, as needed, in accordance with the ability and functions of the communication terminal to which the data should be sent, before actually sending the data.

According to this embodiment, a communication terminal on a network informs the server of the ability and functions of a communication terminal at the transmission destination and the server sends data according to the reported ability and functions. This system is substantially equivalent to a system of informing a server of a request made by the communication terminal to which data should be sent and allowing the server to send data according to that request.

However, this invention is not limited to this particular system, but includes a system of more positively informing a server of a request made by a data transmission destination.

For example, a communication terminal, which can display both an image and text at the time of requesting the server of the search result, may be designed in such a way as to be able to request transmission of text data.

In this embodiment, a server is informed of the ability and functions of a communication terminal to which the search result should be sent every time a data transmission request is given to the server. As a modification, the ability and functions of each communication terminal to which the search result should be sent may be registered in advance in the server so that the server can perform data conversion, edition and the like according to the registered information at the time of sending data.

SECOND EMBODIMENT

Figure 16:
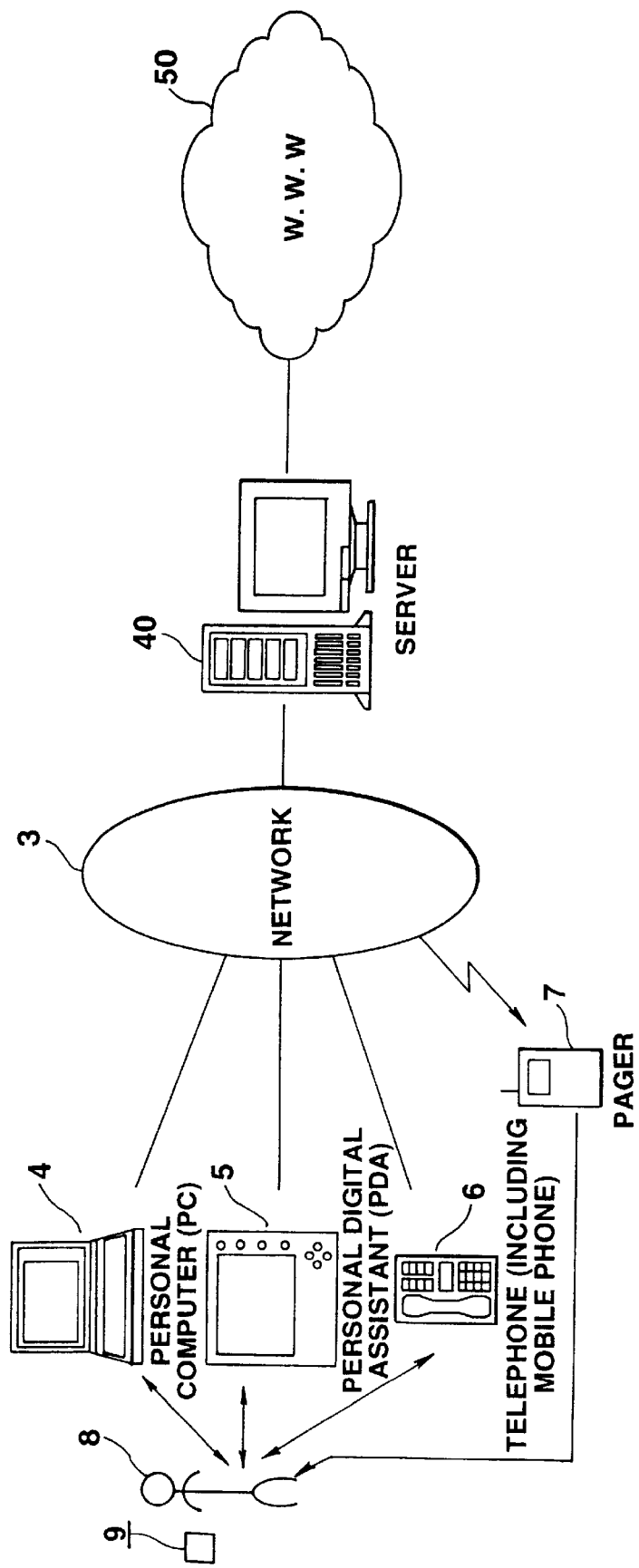
FIG. 16 is a structural diagram of a communication system to be adaptable to a second embodiment of this invention.

FIG. 16 is a structural diagram of a system according to the second embodiment of this invention.

In the system of this embodiment, upon issuance of a search request from a PC (Personal Computer or the like) 4, PDA (Personal Digital Assistant) 5, a telephone (including a mobile phone) 6 or the like, a server 40 acquires information from a Web server (not illustrated) on, for example, a WWW (World Wide Web) 50, and sends the acquired information to a predetermined communication terminal (basically, the one that has made the search request).

At this time, as needed, the server 40 converts data so that the communication terminal at the transmission destination can output the information obtained over the WWW 50, and generates data that can be output by the communication terminal at the transmission destination or reduces the amount of the data based on the obtained information.

The processes including the data conversion are basically the same as those explained earlier with reference to FIGS. 1 through 15.

The server 40 is, for example, a computer owned by a commercial Internet Connection Service Provider (hereinafter called "provider"), and retains information on multiple subscribers.

The basic communication protocol between a client and a server is the HTTP (Hyper Text Transfer Protocol) on the WWW 50.

Information is generally described in the HTML (Hyper Text Markup Language).

Note that the VRML (Virtual Reality Modeling Language) which can express three-dimensional graphics may be used together with the HTML, or the XML (extensible Markup Language) may be used in place of the HTML.

An address for data at the link destination is generally designated by a description scheme called the URL (Uniform Resource Locator).

A Web server on the WWW 50 is provided with an unillustrated search engine.

The search engine searches WWW homepages distributed all over the world for sites which include the contents that match with a keyword acquired by a search requester.

Then, the titles of the homepages of the cites and URLs of the homepages are listed as the results of the search.

Figure 17:
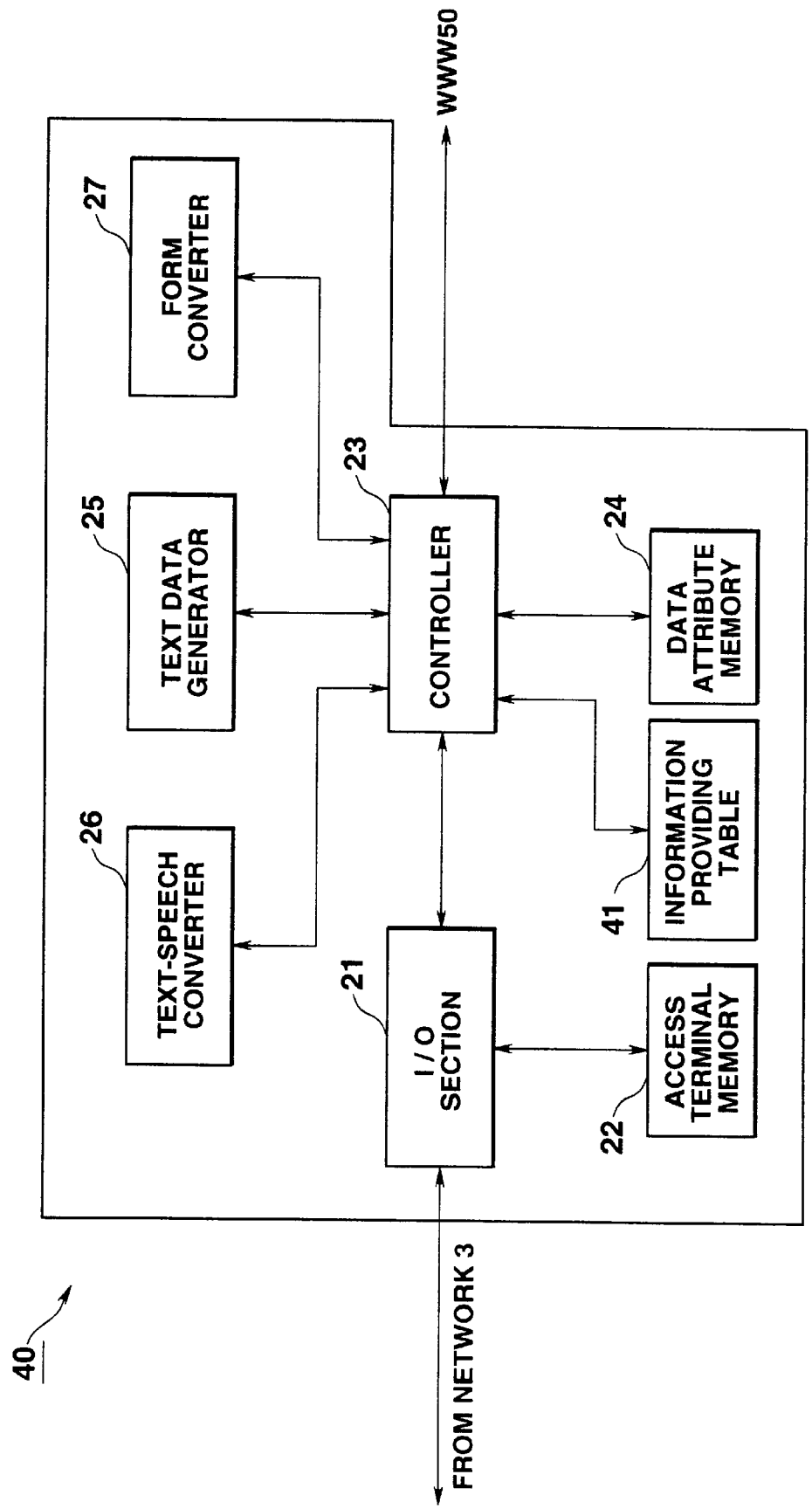
FIG. 17 is a block structural diagram of a server 40 which is used, in the second embodiment.

FIG. 17 is a block structural diagram of the server 40. The server 40 basically is the server 2 shown in FIG. 5 which is additionally equipped with an information providing table 41.

It is to be noted however that the search requester 8 gives the controller 23 a keyword to be searched from, and upon acquisition of the list of URLs that match with the keyword, the controller 23 registers the keyword in association with the list of URLs in the information providing table 41.

Upon reception of the keyword to be searched from the search requester 8, the controller 23 searches the information providing table 41 and sends a list of URLs corresponding to that keyword to the communication terminal which has been designated as the transmission destination by the search requester 8, when the keyword has already been registered.

In a case where the search requester 8 makes a search request associated with a keyword already registered, therefore, the search requester can quickly acquire a list of sites that can provide information about that keyword from the server 40.

The abilities and functions of the individual communication terminals are registered in the access terminal memory 22 as has been described earlier with reference to FIG. 7.

Note however that information such as whether or not the HTML is supported, or whether or not the VRML is supported is also registered in the access terminal memory 22 as one function of each communication terminal.

FIG. 18 presents an example of the information providing table 41.

For each communication terminal, the information providing table 41 is holding a keyword input by the search requester 8 by operating that communication terminal and the search result which is acquired by giving that keyword to the search engine.

The search result includes the titles of the homepages of sites that match with the keyword and the URLs of the homepages.

The information providing table 41 is regularly updated by the process of the controller 23.

Specifically, the controller 23 regularly acquires the latest search result by handing in each keyword, registered in the information providing table 41, to the search engine, and renews the table 41 in accordance with the search result.

When the keyword that was input through the manipulation of any one of the communication terminals 4–6 by the search requester 8 and is not included in the information providing table 41, the controller 23 registers the search result corresponding to the unregistered keyword in the table 41.

The information providing table 41 further stores the date of the previous renewal for each homepage.

The operation of the server 40 will be discussed below.

When detecting a connection request and a search request from any one of the communication terminals 4–6, the server 40 identifies a keyword included in the search request.

When the keyword is registered in the information providing table 41, the server 40 extracts a list of the titles and URLs of homepages of sites corresponding to that keyword from the table 41.

When the keyword is not registered in the information providing table 41, on the other hand, the server 40 requests the search engine to search for the keyword to acquire a list of the titles and URLs of associated homepages.

In transmitting the list and the like (which may include the title of each homepage) to a communication terminal designated by the search requester, the server 2 refers to the access terminal memory 22 shown in FIG. 7 and converts data representing the list and the like to the format which can be output by the communication terminal at the transmission destination.

Then, the list and the like are sent to the communication terminal.

Therefore, each communication terminal can certainly output the URLs of sites which provide information associated with the keyword desired by the search requester 8.

For example, a personal computer or the like displays the URL list and the like in graphics, a PDA with limited functions displays them in text, and a telephone outputs them in voice.

When the search requester 8 designates the desired URL from the URL list, information obtained from the homepage corresponding to that URL is downloaded via the server 40 to the communication terminal that is operated by the search requester 8.

At this time, the server 40 performs a predetermined process of converting the data format of this information or reducing the data amount of the information as needed. This process is basically executed according to the flowcharts illustrated in FIGS. 13 to 15.

Note that text data alone or voice data alone is extracted from a homepage described in the HTML, as needed, in this embodiment.

The server 40 carries out the predetermined process by analyzing the contents described in the HTML.

For example, image data, text data and voice data may be extracted as separate groups from the homepage by referring to the "tags" in the text.

In a case of transmitting data associated with a homepage to the communication terminal of the search requester, which has a function of displaying images but does not support the HTML, the server 40 may develop image data described in the HTML and send the developed data to the communication terminal.

According to the second embodiment, as apparent from the above, since the server 40 provided on a network generates data of the format outputtable by the communication terminal at the transmission destination from information acquired from a WWW homepage, even a communication terminal which does not support the HTML can output information associated with the homepage.

For example, even a communication terminal without a display function (e.g., a telephone) can acquire information associated with a homepage in voice.

As a modification of the second embodiment, the system may be constructed in such a way that a category of information to be transmitted is registered in a provider (service network) for each subscriber, allowing the search requester 8 to view only the necessary information.

The ability and functions of each communication terminal are registered in the provider in this case too.

The provider sends out information belonging to the category registered for each search requester in the data format that matches with the registered ability and functions.

This system is considered effective in, for example, a push type service.

In implementing this modification, each provider should acquire information which is considered effective for the search requester 8 from the WWW or the like, and should analyze the contents of the information to determine the categories of individual information in advance.

This analysis counts the frequency of occurrence of words (particularly, nouns) present in each information and assume the category from a frequently used word.

THIRD EMBODIMENT

In the first embodiment, image data to be stored in the database 1 in association with text data as the abstract of that image data.

In some case, however, pages expressed in text, such as articles on newspapers/magazines, are stored as image data in the database 1 and the names and date of issue of the newspapers/magazines, written page numbers, the titles of the articles, and so forth are stored in the form of text as the abstracts of the articles.

In the first embodiment, if the search requester 8 designates a communication terminal incapable of displaying image data (the pager 7) as the transmission destination for the search result, only text data (the mentioned abstract) is sent so that the search requester 8 cannot grasp the substance of the acquired search result (the contents of the retrieved article in this case).

The third embodiment, which is devised to overcome this problem, will now be described below.

To avoid the redundant description, like or same reference numerals are given to components and blocks in the third embodiment which are substantially the same as those of the first embodiment.

Figure 19:
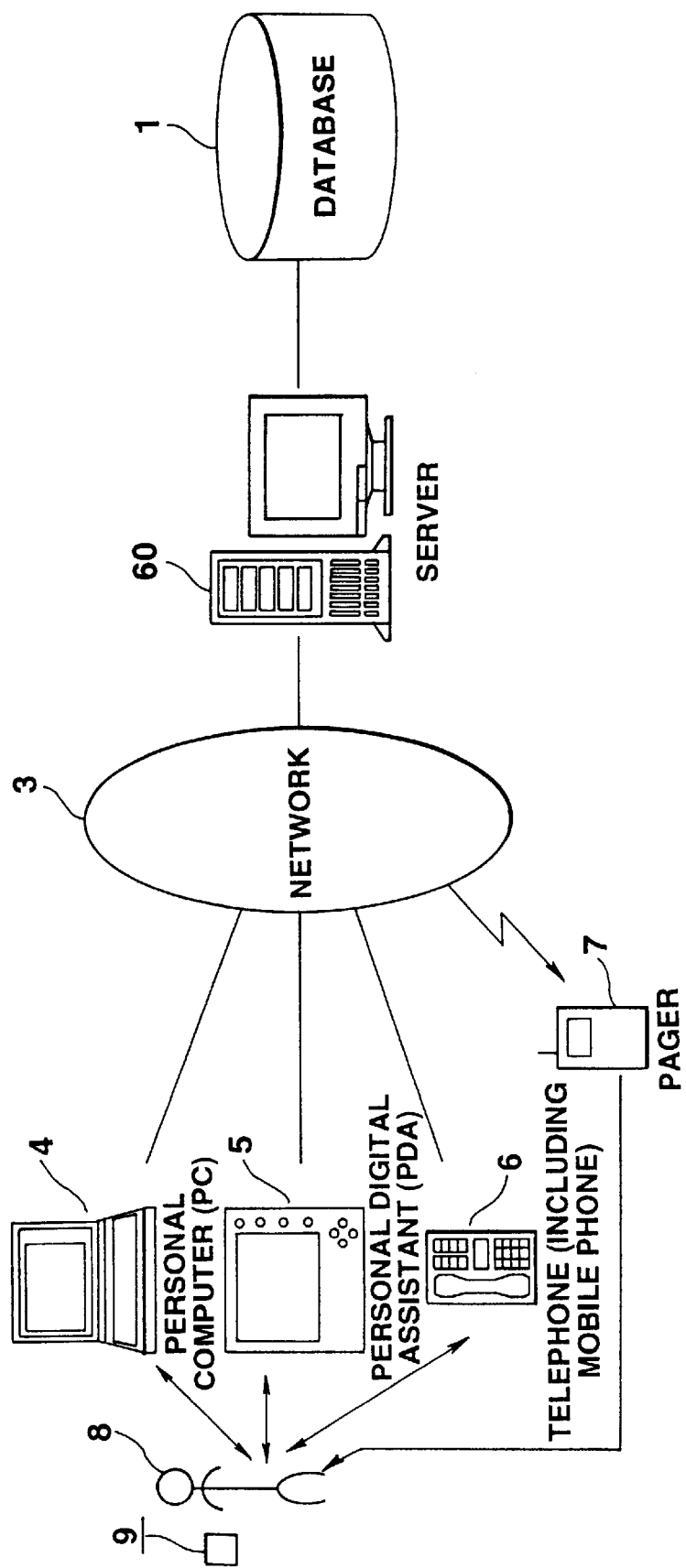
FIG. 19 is a structural diagram of a communication system to be adaptable to a third embodiment of this invention.

FIG. 19 is a structural diagram of a communication system which is adapted to the third embodiment of this invention.

A server 60 analyzes a search request, sent over the network 3 from a search requester 8, and accesses the database 1 to acquire the search result.

Before outputting the search result to the network 3, the server 60 converts, as needed, part of the search result to data which is expressed by another attribute or edits the search result in accordance with the ability and functions of the communication terminal to which the search result should be sent.

Figure 20:
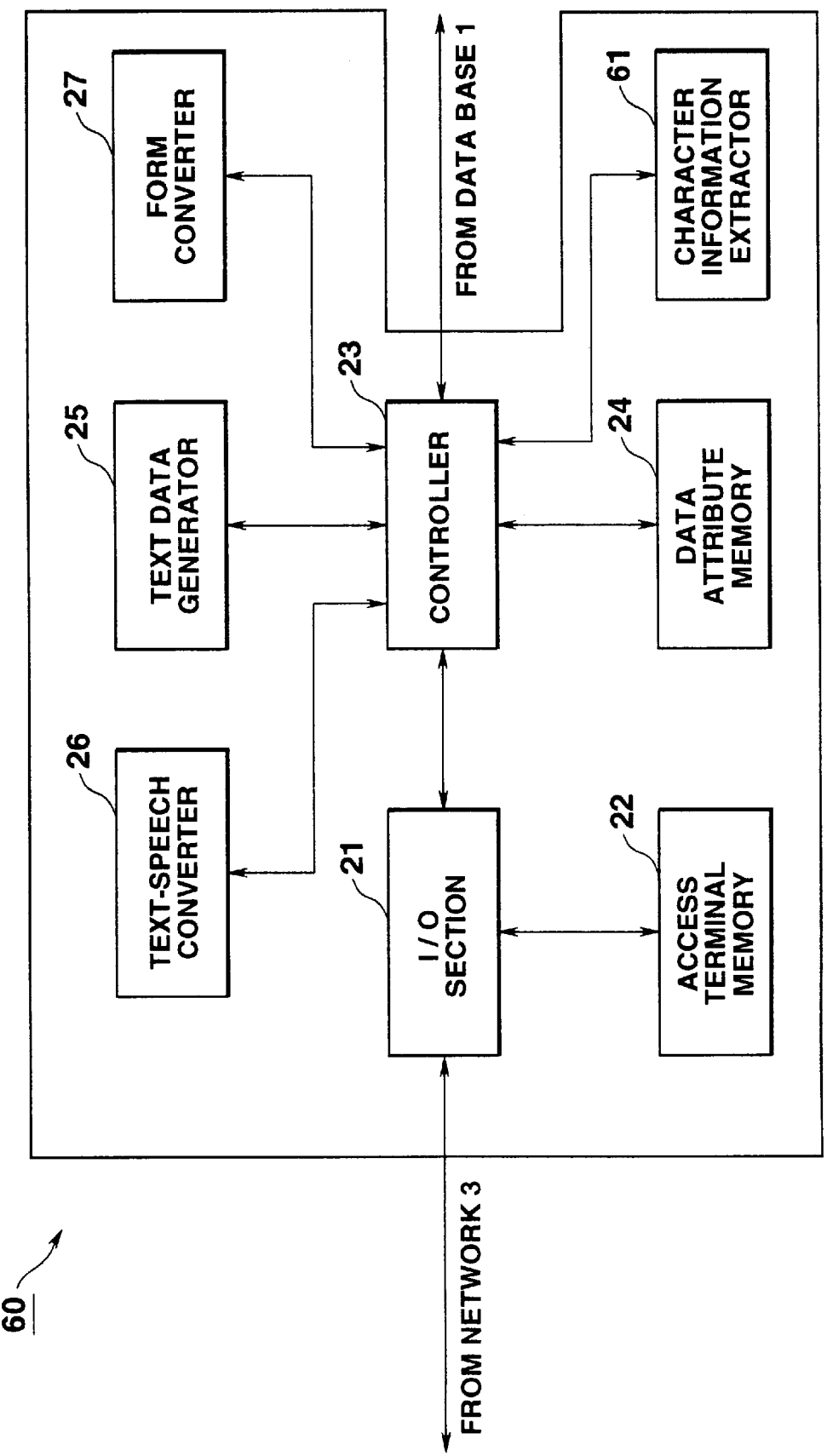
FIG. 20 is a block structural diagram of a server 60 according to the third embodiment.

This "conversion," for example, is to convert the search result (data) to data of another attribute (e.g., from text data to voice data), or to convert data of a predetermined format to data of another format, or, when data obtained as a result of the search is image data and the communication terminal to which the search result should be sent is incapable of displaying images, to extract only character information in the image data by means of a character information extractor 61 to be discussed later and convert the character information to text data. (The character information extractor 61 identifies paragraphs in character information, separates the converted text and determines the first text that has the highest priority.) FIG. 20 is a block diagram of the server 60.

Figure 21:
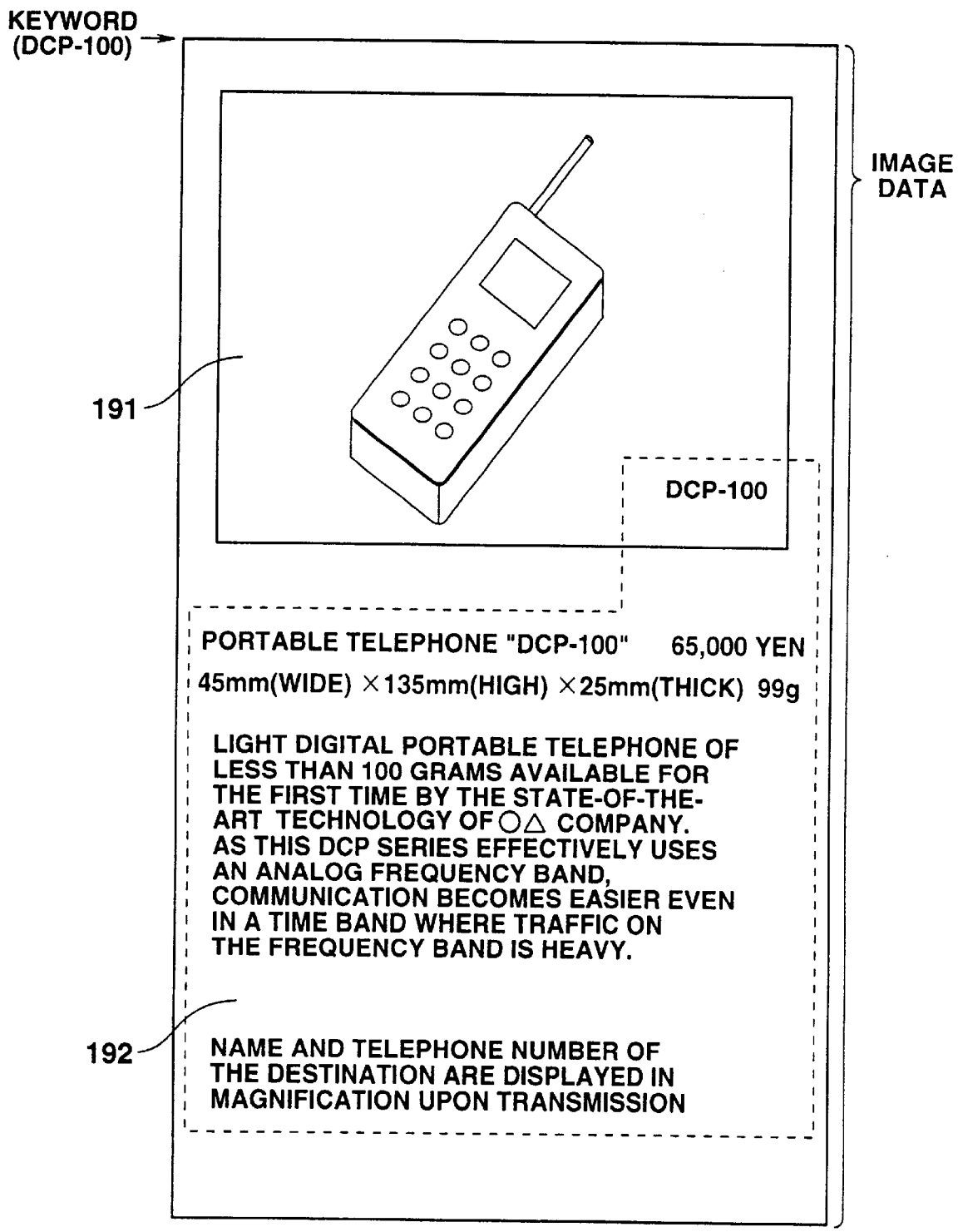
FIG. 21 shows one example of data (image) stored in the database 1 according to the third embodiment.

In this embodiment, image data having an image portion 191 and a character information 192 as shown in FIG. 21 is stored in the database 1, and the data attribute in this case is "image."

As needed, the controller 23 performs a predetermined process on data of the search result acquired from the database 1, in cooperation with the character information extractor 61 in addition to the text data generator 25, the text-speech converter 26 and the compression form converter 27, in such a way that the resultant data can be output by the communication terminal at the transmission destination.

When the search result is image data and the communication terminal to which the search result should be sent does not have an image display function, for example, the controller 23 instructs the character information extractor 61 to identify and extract only character information from the image data, and then converts the character information to text data.

Figure 22:
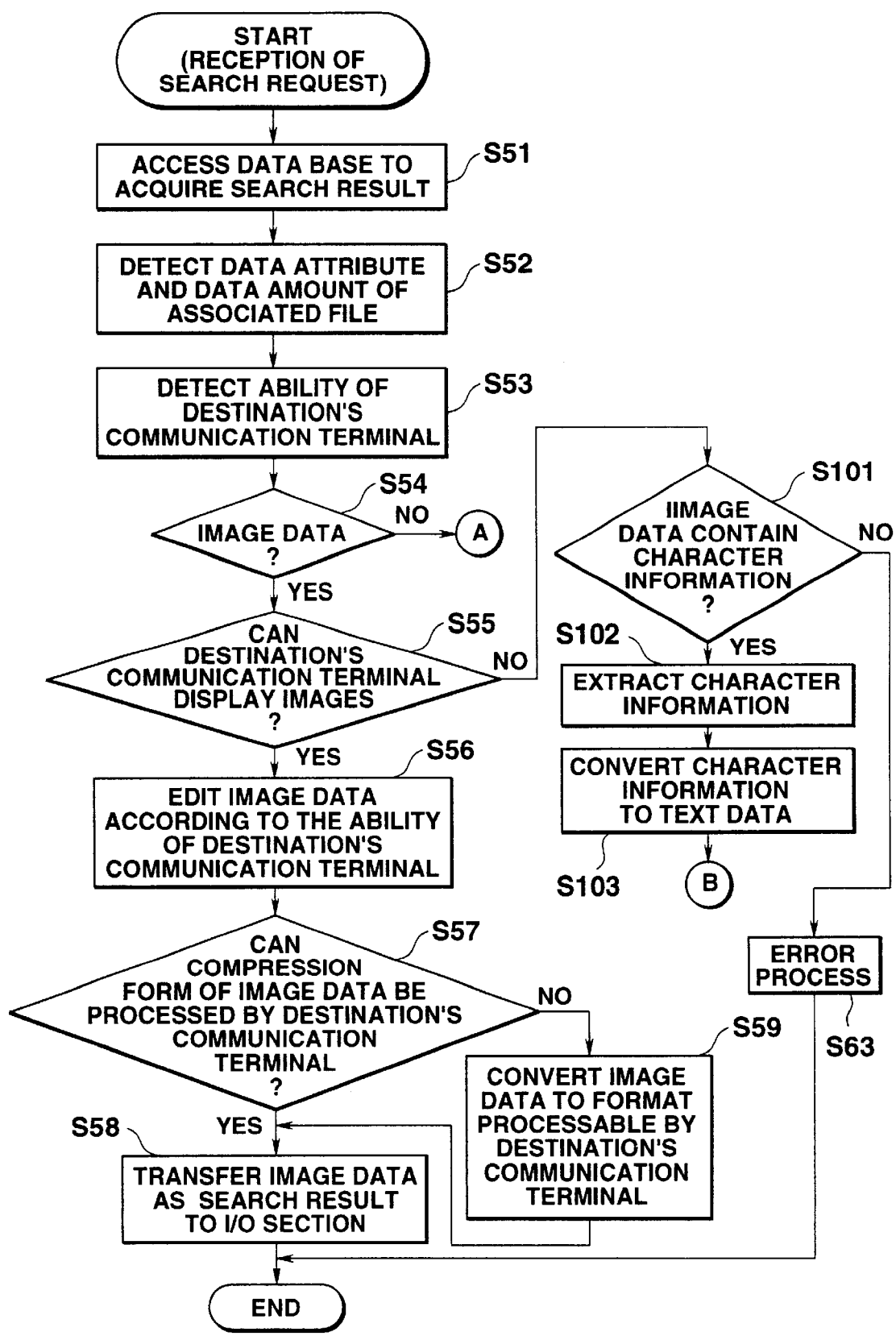
FIG. 22 is a flowchart for explaining the operation that is executed by the controller 23 according to the third embodiment.

FIG. 22 is a flowchart for explaining the operation of the controller 23 (which is particularly associated with the character information extractor 61).

Steps S51 to S59 and steps S71 to S84 in FIG. 22 are the same as the operation of the controller 23 which has been explained earlier with reference to FIGS. 13 and 14.

When it is determined in step S55 that the communication terminal at the transmission destination cannot display image data, the controller 23 determines if image data contains a character information portion (step S101).

Upon determination in step S101 that the image data contains a character information portion, the controller 23 extracts the character information portion (step S102), converts it to text data (step S103), and then proceeds to step S72.

When determining in step S101 that the image data contains no character information portion, the controller 23 executes an error process of outputting text data, for example, "Search result cannot be output" (step S63).

According to the third embodiment, as apparent from the above, even if pages expressed in text, such as articles on newspapers/magazines, are stored and managed in the database 1, the search requester 8 can grasp the substance of the acquired search result (the contents of the retrieved article).

According to the first to third embodiments, the contents of processes associated with the server 2, 40 or 60 are stored in the memory device 11. Substantially, however, the contents of the processes may be stored in a portable storage medium (CD-ROM, FDD or the like) which stores programmed executable software in a case of a system which conforms to any of the hardware structures in FIGS. 4, 5, 6, 16, 17, 19 and 20.

As a modification of the embodiments, the communication terminals 4–6 may each be provided with a storage section for storing a program which is run on the communication terminal, and this program may be downloaded in this storage section from the server 2, 40 or 60 as needed. Alternatively, the portable storage medium 9 (CD-ROM, FDD or the like) which stores software including a program described in a form executable by the communication terminals 4–6 may be connected to any of the communication terminals 4–6 as shown in FIGS. 1, 16 and 19 so that the program can be installed on the communication terminal in use.

According to those embodiments, the program number corresponding to the communication terminal to which the search result should be output, an OS executable on this communication terminal and an application program executable on the communication terminal are stored in association with one another in the program table in FIG. 7B, and the controller 23 sends data, which is obtained through conversion according to those information, to the communication terminal at the transmission destination.

However, this invention is not limited to this data transmitting scheme, but the controller 23 can determine only the invokable OS from the program number of the communication terminal to which the search result should be sent, in the program table in FIG. 7B, and can send to-be sent data appended to the application program needed to output this data.

This invention can be adapted to every data output system, data output method and communication terminal within the spirit and scope of the invention.

What is claimed is:

1. A data output system comprising:
   data storage means for storing data of a plurality of types of data formats, said data storage means being located on an information public network specified by at least an address for designating a storage position for data;
   input means for inputting a search request for data stored in said data storage means;
   connection means for detecting said search request input through said input means and supplying said search request to said data storage means;
   identification means for searching data stored in said data storage means based on a content of said search request and identifying a data format of a search result;
   detection means for detecting a data format requested by a data transmission destination based on said content of said search request;
   collation means for collating said data format of said search result, identified by said identification means, with said data format requested by said data transmission destination and detected by said detection means;
   conversion means for converting said data format of said search result to said data format requested by said data transmission destination, when both data formats do not match with each other;
   output means for outputting said search result whose data format has been converted by said conversion means to said data transmission destination;
   acquisition means for acquiring information for specifying said data; and
   search means for searching for an address of said storage position for said data, based on said information acquired by said acquisition means;
   wherein said conversion means reads data stored at said searched address by said search means and converts said read data in such a way that a format of said read data matches said data format detected by said detection means.

2. The data output system according to claim 1, wherein said input means comprises:
   switch means for switching a control content in accordance with a data format to be input;
   discrimination means for discriminating said data format of said search request input through said input means; and
   control means for controlling said switch means in accordance with said data format discriminated by said discrimination means.

3. The data output system according to claim 1, wherein said data format requested by said data transmission destination is included in said search request.

4. The data output system according to claim 1, further comprising:
   communication terminals externally connected to said data output system via a network; and
   reception means for receiving data from said communication terminals;
   wherein said input means inputs said data, received by said reception means, as at least one of a search request and a data format requested by a data transmission destination.

5. The data output system according to claim 4, wherein said data format requested by said data transmission destination is a format of data outputtable by a communication terminal to which said data is to be output.

6. The data output system according to claim 4, wherein said detection means detects an ability of a communication terminal to which data is to be output, as said data format requested by said data transmission destination; and
   said conversion means includes processing means for processing data, read from said data storage means, based on said ability of said communication terminal detected by said detection means.

7. The data output system according to claim 4, wherein said detection means detects a function of a communication terminal to which data is to be output, as said data format requested by said data transmission destination; and
   said conversion means includes processing means for processing data, read from said data storage means, based on said function of said communication terminal detected by said detection means.

8. The data output system according to claim 4, wherein said detection means detects a capacity of a communication terminal to which data is to be output, as said data format requested by said data transmission destination; and
   said conversion means includes processing means for processing data, read from said data storage means, based on said capacity of said communication terminal detected by said detection means.

9. The data output system according to claim 1, wherein said information for specifying said data is a keyword.

10. The data output system according to claim 1, further comprising report means for reporting said searched address to a requester which has requested an output of data.

11. A communication terminal comprising:
    connection means for connecting to an external database located on an information public network; and
    transmission means for transmitting data including first data for instructing an output of desired data from data of a plurality of types of data formats, stored in said external database, second data for specifying an address of a communication terminal to which said desired data is to be output, and third data for specifying the data format outputtable by the communication terminal, to the external database located on an information public network, which searches and reads out data specified by the first data, converts said read data in such a way that a format of said read data matches said data format specified by said third data, and transmits said converted data to said communication terminal specified by said second data.

12. The communication terminal according to claim 11, wherein the data format outputtable by the communication terminal defines an ability of said communication terminal to which data is to be output.

13. The communication terminal according to claim 11, wherein the data format outputtable by the communication terminal defines a function of said communication terminal to which said data is to be output.

14. The communication terminal according to claim 11, wherein the data format outputtable by the communication terminal defines a capacity of said communication terminal to which said data is to be output.

15. The communication terminal according to claim 11, wherein a control content for generating data to be transmitted by said transmission means is stored on a storage medium attachable to and detachable from said communication terminal.

16. The communication terminal according to claim 11, wherein a control content for generating data to be transmitted by said transmission means is acquired from said database.

17. A data output method for connecting to a data storage medium for storing data of a plurality of types of data formats and outputting data, the method comprising the steps of:

inputting a search request for data stored in said data storage medium, said data storage medium being located on an information public network specified by at least an address for designating a storage position for data;

supplying said search request to said data storage medium;

searching data stored in said data storage medium based on a content of said search request and identifying a data format of a search result;

detecting a data format requested by a data transmission destination based on said content of said search request;

collating said data format of said search result, identified by said identification, with said data format detected by said detecting;

converting said data format of said search result when said data format of said search result does not match with said data format requested by said data transmission destination;

acquiring information for specifying said data; and searching an address of said storage position for said data, based on the acquired information;

wherein said data-searching step searches data stored at said address searched by said address-searching step and converts the searched data in such a way that a format of said searched data matches said data format detected by said detection step.

18. A storage medium which stores a program to be run by a data output system connected to data storage means which stores data of a plurality of types of data formats and outputs data from said data storage means, said storage medium storing the programmed procedures of:

(A) inputting a search request for data stored in said data storage means, said data storage means being located on an information public network specified by at least an address which designates a storage position for data;

(B) supplying said search request to said data storage means;

(C) searching data stored in said data storage means based on a content of said search request and identifying a data format of a search result;

(D) detecting a data format requested by a data transmission destination based on said content of said search request;

(E) collating said data format of said search result, identified by Step C, with said data format detected by Step D;

(F) converting said data format of said search result when said data format of said search request does not coincide with said data format requested by said data transmission destination;

(G) acquiring information for specifying said data; and (H) searching an address of said storage position for said data based on the acquired information; and wherein said data-searching step searches data stored at said address searched by said address-searching step and converts searched data in such a way that a format of said searched data matches said data format detected by said detection step.

19. A storage medium which stores a program to be run by a communication terminal for connecting to a data output apparatus connected to data storage means for storing data of a plurality of types of data formats, transmitting a search request for data to said data output apparatus, and acquiring data of a plurality of types of data formats as a search result, said storage medium having a programmed procedure of transmitting data including at least an address of a communication terminal to which said data is to be output, and a data format outputtable by the communication terminal, as said search request for data stored in said data storage means, wherein said data storage means is located on an information public network specified by at least an address which designates a storage position for data.

20. A program data signal controlled by a data output system, which is connected to data storage means which stores data of a plurality of types of data formats and outputs data from said data storage means, said program data signal including programmed procedures of:

inputting a search request for data stored in said data storage means, said data storage means being located on an information public network specified by at least an address which designates a storage position for data;

supplying said search request to said data storage medium;

searching data stored in said data storage means based on a content of said search request and identifying a data format of a search result;

detecting a data format requested by a data transmission destination based on said content of said search request;

collating said data format of said search result with said detected data format;

converting said data format of said search result when said data format of said search request does not coincide with said data format requested by said data transmission destination;

acquiring information for specifying said data; and searching for an address of said storage position for said data, based on the acquired information; and wherein said searching data step searches data stored at said address searched by said searching for an address step and converts searched data in such a way that a format of said searched data coincides with said data format detected by said detecting step.

* * * * *